US00RE36625E

United States Patent [19]

Herr et al.

[11] E Patent Number: Re. 36,625

[45] Reissued Date of Patent: Mar. 21, 2000

[54] LINEAR AND CYCLIC POLYMERS OR OLIGOMERS HAVING A PHOTOREACTIVE ETHENE GROUP

[75] Inventors: Rolf-Peter Herr, Lörrach-Stetten, Germany; Stephen Kelly, Beverly, United Kingdom; Martin Schadt, Seltisberg, Switzerland; Klauss Schmitt, Lörrach; Andreas Schuster, Freiburg, both of Germany

[73] Assignee: Rolic AG, Allschwil, Switzerland

[21] Appl. No.: 09/119,787

[22] Filed: Jul. 21, 1998

Related U.S. Patent Documents

Reissue of:

[64] Patent No.: 5,539,074
Issued: Jul. 23, 1996
Appl. No.: 08/191,835
Filed: Feb. 4, 1994

[30] Foreign Application Priority Data

Feb. 17, 1993 [CH] Switzerland ..... 488/93
Feb. 23, 1993 [CH] Switzerland ..... 553/93

[51] Int. Cl.[7] ..... C08F 28/20

[52] U.S. Cl. ..... 526/245; 526/258; 526/279; 526/292.1; 526/293; 526/297; 526/304; 526/305; 526/311; 526/326; 526/328; 526/347

[58] Field of Search ..... 526/245, 258, 526/279, 292.1, 293, 297, 304, 305, 311, 326, 328, 347

[56] References Cited

U.S. PATENT DOCUMENTS 4,974,941 12/1990 Gibbons et al. ..... 350/349
5,190,687 3/1993 Hachiya et al. ..... 252/299.1

FOREIGN PATENT DOCUMENTS 0240276 10/1987 European Pat. Off. .
445629 11/1991 European Pat. Off. .
482985 4/1992 European Pat. Off. .

OTHER PUBLICATIONS

Nishikubo et al., Macromolecules 18:2131–2135 (1985).
Barley et al., Makomol. Chem. 192:2801–2810 (1991).
Kawanishi et al., Polymers for Advanced Technologies 1:311–318 (1990).
Derwent Abstract for EP 482 985.
Schadt et al., "Surface–induced parallel alignment of liquid crystals by linearly polymerized photopolymers" Jpn. J. Appl. Phys. 31:2155–2164 (1992).
Ichimura et al., "Reversible change in alignment mode of nematic liquid crystals regulated photochemically by command surfaces, modified with an azobenzene monolayer", Langmuir 4:1214–1216 (1988).
Seki et al., "Photochemical alignment regulation of a nematic liquid crystals by Langmuir–Blodgett layers of azobenzene polymers as command surfaces", Macromolecules 22:3505–3506 (1989).
Ichimura et al., "Reversible alignment change of liquid crystals induced by photochromic molecular films, reversible alignment of a nematic liquid crystal induced by pendent azobenzene groups—containing polymer thin films", Makromol. Chem., Rapid Commun. 10:5–8 (1989).
Ichimura et al., "Photocontrol of in–plane alignment of a nematic liquid crystal by a photochromic spiropyran momolayer absorbing linearly polarized light", Chemistry Letters, pp. 1063–1066 (1992).
Abstract 93–037881/05 for EP 525 477 (1993).
Abstract 93–037882/05 for EP 525 478 (1993).
Abstract 93–037877/05 for EP 525 473 (1993).

*Primary Examiner*—Bernard Lipman
*Attorney, Agent, or Firm*—Finnegan, Henderson, Farabow, Garrett & Dunner, L.L.P.

[57] ABSTRACT

The invention is concerned with linear and cyclic polymers or oligomers having a photoreactive ethene group. The polymers are of the formula

I

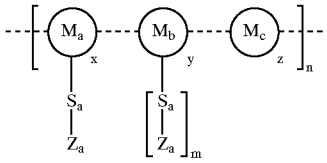

wherein $M_a$, $M_b$, $M_c$ are monomer units for homo- or copolymers;

x, y, z are mole fractions of the copolymers, whereby in each case $0<x\leqq 1$; $0\leqq y\leqq 1$ and $0\leqq z<1$;

$S_a$, $S_b$ are spacer units;

$Z_a$, $Z_b$ are molecular units which can undergo photochemical isomerization/dimerization;

n is a magnitude of 4–100 000 and m is 0 or 1,

The compounds are used as an orienting layer for liquid cyrstals.

8 Claims, No Drawings

LINEAR AND CYCLIC POLYMERS OR OLIGOMERS HAVING A PHOTOREACTIVE ETHENE GROUP

Matter enclosed in heavy brackets [ ] appears in the original patent but forms no part of this reissue specification; matter printed in italics indicates the additions made by reissue.

FIELD OF THE INVENTION

The invention is concerned with novel linear and cyclic polymers or oligomers having a photoreactive ethene group for use as orientating layers for liquid crystals.

BACKGROUND OF THE ART

The alignment of liquid crystal phases in cells can be brought about in various ways and is usually effected by rubbing a glass plate coated with a polymer layer or by the inclined vapour deposition of a $SiO_x$ layer on a glass plate. Generally uniformly aligned layers are produced in this manner.

It is, however, also possible to obtain a structured orientation of the liquid crystal phase. This can be achieved, for example, by coating a glass plate with a polymer with which are admixed, for example, photochemically orientatable dyestuff molecules or photochemically dimerizable molecules, as described, for example, in EP-A-0445629. These methods are, however, not optimal, since on the one hand the solubility of such orientatable molecules in the polymer is limited and on the other hand the stability with time can not be guaranteed to a sufficient extent. A further possibility for the production of photochemically orientatable polymer layers is described, for example, in Jpn. J. Appl. Phys. Vol. 31 (1992), 2155 and comprises esterifying the free hydroxy groups on the polymer with dimerizable units. A disadvantage of this method is, however, the fact that the esterification of the free hydroxy groups on the polymer with photochemically dimerizable units usually leads to a non-reproducible and, above all, to an incomplete conversion. The free hydroxy groups still present in the orientating layer lead to an undesired ion solubility.

There is therefore a need to find an orientating layer which no longer has the aforementioned disadvantages.

SUMMARY OF THE INVENTION

The present invention is directed to a polymer of formula I

I

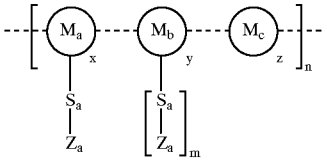

wherein $M_a$, $M_b$, $M_c$ are monomer units for homo- or copolymers;

x, y, z are mole fractions of the copolymers, whereby in each case $0<x\leqq 1$; $0\leqq y\leqq 1$ and $0\leqq z<1$;

$S_a$, $S_b$ are spacer units;

$Z_a$, $Z_b$ are molecule units which can undergo photochemical isomerization/dimerization;

n is from 4–100 000 and m is 0 or 1.

DETAILED DESCRIPTION OF THE INVENTION

The present invention is directed to a polymer having isomerization/dimerization units of the general formula:

I

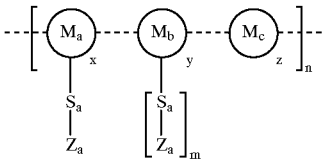

wherein $M_a$, $M_b$, $M_c$ signify monomer units for homo- or copolymers;

x, y, z indicate mole fractions of the copolymers, whereby in each case $0<x\leqq 1$; $0\leqq y\leqq 1$ and $0\leqq z<1$;

$S_a$, $S_b$ represent spacer units;

$Z_a$, $Z_b$ represent molecule units which can undergo photochemical isomerization/dimerization;

n is a magnitude of 4–100 000 and m is 0 or 1.

The monomer units $M_a$, $M_b$ and $M_c$ set forth in formula I are units for the formation of homopolymers or copolymers and have, in the is scope of the present invention, the structures which are usual in polymer chemistry. Such monomer units are, for example, acrylate, methacrylate, 2-chloroacrylate, 2-phenylacrylate, acryloylphenylene, acrylamide, methacrylamide, 2-choroacrylamide, 2-phenylacrylamide, vinyl ether, styrene derivatives, vinyl ester, maleic acid derivatives, fumaric acid derivatives, siloxanes, epoxides and the like. Acrylate, methacrylate, 2-chloroacrylate, acrylamide, methacrylamide, 2-chloroacrylamide, styrene derivatives, siloxanes and the like are preferred monomer units.

Under the term "copolymers" there are to be understood not only statistical copolymers but also alternating copolymers, for example alternating copolymers from maleic acid derivatives with styrene. Statistical copolymers are preferably used. Homopolymers embrace linear and cyclic polymers such as, for example, cyclic polysiloxane.

Polymers in which z=0, but especially homopolymers of formula 1-A:

I-A

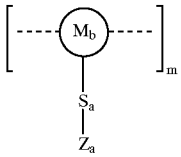

are especially preferred.

The spacer units Sa and, respectively, $S_b$ join the isomerization/dimerization unit ($Z_a$ and, respectively, $Z_b$) with the monomer unit ($M_a$ and, respectively, $M_b$). Such spacer units are known per se. In the present instance the term "spacer units" $S_a$ and $S_b$ signifies, for example, independently of one another, an alkylene chain with 1 to 10, preferably with 1 to 4, carbon atoms, a cycloalkylene group with 3 to 8 carbon atoms, preferably with 5 or 6 carbon atoms, in which optionally one or two methylene groups can be replaced by NH groups, or phenylene, which can be substituted with lower alkyl, lower alkoxy, —CN, —$NO_2$, but especially with halogen, or carbonate, an ester group, an amide group, an ether group and the like or a combination of the said groups.

Methylene, 1,2-ethylene, 1,3-propylene, 1,4-butylene, 1,2-propylene, 1,3-butylene, cyclopentane-1,2-diyl, cyclopentane-1,3-diyl, cyclohexane-1,3-diyl, cyclohexane-1,4-diyl, piperidine-1,4-diyl, piperazine-1,4-diyl, 1,2-phenylene, 1,3-phenylene, 1,4-phenylene, ethyleneoxy, ethyleneoxycarbonyl, ethylenecarboxyl, CONH— and —CONR' in which R' signifies lower alkyl are examples of preferred spacer units ($S_a$ and $S_b$).

The isomerization/dimerization units $Z_a$ and $Z_b$ are molecule units which can undergo either photochemical cis/trans-isomerization and photochemical [2+2] cycloaddition and thus lead to a cross-linking of the polymer or oligomer. The isomerization/dimerization units $Z_a$ and $Z_b$ are, as already mentioned, linked via the spacer $S_a$ to the monomer unit $M_a$, or via a spacer $S_b$ to the monomer unit $M_b$ and each independently have the general formula

II

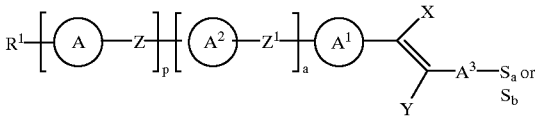

In formula II, ring $A^1$ signifies 1,4-phenylene, which is unsubstituted or substituted with halogen, cyano and/or nitro and in which 1 or 2 CH groups can be replaced by nitrogen, or 2,5-thiophenediyl, 2,5-furanylene, 1,4- or 2,6-naphthylene, in which a CH group can be replaced by nitrogen;

ring A,$A^2$ each individually signify 1,4-phenylene, which is unsubstituted or substituted with halogen, cyano and/or nitro and in which 1 or 2 CH groups can be replaced by nitrogen, or 2,5-thiophenediyl, 2,5-furanylene, trans-1,4-cyclohexylene, trans-1,3-dioxane-2,5-diyl or 1,4-piperidyl;

$A^3$ signifies —COO—, —CONH—, —CO—E—, 1,4-phenylene, which is unsubstituted or substituted with halogen, cyano and/or nitro and in which 1 or 2 CH groups can be replaced by nitrogen, or 2,5-thiophenediyl, 2,5-furanylene, 1,4- or 2,6-naphthylene, in which a CH group can be replaced by nitrogen;

E signifies 1,4-phenylene, which is unsubstituted or substituted with halogen, cyano and/or nitro and in which 1 or 2 CH groups can be replaced by nitrogen, or 2,5-thiophenediyl, 2,5-furanylene, 1,4- or 2,6-naphthylene, in which a CH group can be replaced by nitrogen;

Z,$Z^1$ each independently signify a single covalent bond, —$CH_2CH_2$—, —COO—, —OOC—, —$OCH_2$—, —$CH_2O$—, —C≡C—, —$(CH_2)_4$—, —$O(CH_2)_3$—, —$(CH_2)_3O$— or the trans form of —$OCH_2CH$═CH—, —CH═$CHCH_2O$—, —$(CH_2)_2CH$═CH— or —CH═$CH(CH_2)_2$—;

$R^1$ signifies hydrogen, halogen, cyano, nitro, NCS, alkyl with 1 to 12 carbon atoms, which is optionally substituted with fluorine and in which optionally 1 or 2 non-adjacent —$CH_2$— groups can be replaced by oxygen, —COO—, —OOC—, —CO— and/or a —$CH_2CH_2$— group can be replaced by —CH═CH—;

n,p each independently signify 0 or 1;

X,Y each independently signify hydrogen, halogen cyano, alkyl with 1 to 12 carbon atoms which is optionally substituted with fluorine and in which optionally 1 or 2 non-adjacent —$CH_2$— groups can be replaced by oxygen, —COO—, —OOC—, —CO— and/or —CH═CH—; and $S_a$, $S_b$, signify spacer units;

with the proviso that $A^3$ is different from —COO—, when n and p each are 0, $A^1$ signifies phenyl, $R^1$ signifies hydrogen or methoxy and $S_a$ and, respectively, $S_b$ signify a single bond.

The ethene groups of the isomerization/dimerization units of formula II which are not or only to a small extent incorporated into the polymer under the polymerization conditions, can be selectively aligned, after the application of the polymer layer to a carrier, by irradiation with linear polarized light. This takes place either by isomerization of the ethene group, by dimerization of the ethene group or by simultaneous isomerization and dimerization of these ethene groups. Very specific surface regions can be aligned by the selective irradiation of the molecule units of formula II and these regions are also simultaneously stabilized by the dimerization. The term "1,4-phenylene, which is unsubstituted or substituted with halogen, cyano and/or nitro and in which 1 or 2 CH groups can be replaced by nitrogen" includes 1,4-phenylene, 2-fluoro-1,4-phenylene, 2,3-difluoro-1,4-phenylene, 2,6-difluoro-1,4-phenylene, 2-chloro-1,4-phenylene, 2,3-dichloro-1,4-phenylene, 2,6-dichloro-1,4-phenylene, 2-cyano-1,4-phenylene, 2,3-dicyano-1,4-phenylene, 2-nitro-1,4-phenylene, 2,3-dinitro-1,4-phenylene, 2-bromo-1,4-phenylene, 2-methyl-1,4-phenylene, as well as pyridine-2,5-diyl, pyrimidine-2,5-diyl and the like. 1,4-Phenylone, 2-fluoro-1,4-phenylene, 2,3-difluoro-1,4-phenylene, 2,6-difluoro-1,4-phenylene, pyridine-2,5-diyl or pyrimidin-2,5-diyl are especially preferred.

The term "1,4- or 2,6-naphthylene, in which a CH group can be replaced by nitrogen" includes 1,4-naphthylene, 2,6-naphthylene, 1-benzazine-2,6-diyl and 2-benzazine-1,4-diyl.

The term "alkyl with 1 to 12 carbon atoms, which is optionally substituted with fluorine and in which optionally 1 or 2 non-adjacent —$CH_2$— groups can be replaced by oxygen, —COO—, —OOC—, —CO— and/or a —$CH_2CH_2$— group can be replaced by —CH═CH—" includes straight-chain and branched (optionally chiral) residues such as alkyl, alkenyl, alkoxy, alkenyloxy alkoxyalkyl, alkenyloxyalkyl, alkoxyalkenyl, 1-fluoroalkyl, 1,1-difluoroalkyl, 2-fluoroalkyl, 2-fluoroalkoxy, terminal fluoroalkyl, terminal difluoromethylalkyl, terminal trifluoromethylalkyl, terminal trifluoromethylalkoxy, and the like with 1 or, respectively, 2 to 12 carbon atoms. Examples of preferred residues are methyl, ethyl, propyl, butyl, pentyl, hexyl, heptyl, octyl, 1-methylpropyl, 1-methylheptyl, 2-methylbutyl, 3-methylpentyl, vinyl, 1E-propenyl, 1E-butenyl, 1E-pentenyl, 1E-hexenyl, 3-butenyl, 3E-pentenyl, 3E-hexenyl, 4-pentenyl, 4Z-hexenyl, 5-hexenyl, 6-heptenyl, 7-octenyl, methoxy, ethoxy, propyloxy, butyloxy, pentyloxy, hexyloxy, heptyloxy, octyloxy, 1-methylpropyloxy, 1-methylheptyloxy, 2-methylbutyloxy, allyloxy, 2E-butenyloxy, 2E-pentenyloxy, 3-butenyloxy, 3Z-pentenyloxy, 4-pentenyloxy, 5-hexenyloxy, 6-heptenyloxy, 7-octenyloxy, 2-methoxyethyl, 3-methoxypropyl, 3-methoxy-1E-propenyl, 1-fluoropropyl, 1-fluoropentyl, 2-fluoropropyl, 2,2-difluoropropyl, 3-fluoropropyl, 3,3-difluoropropyl, 3,3,3-trifluoropropyl, 2-fluoropropyloxy, 3-fluoropropyloxy, 2,2-difluorovinyl, 2-(3,3-difluoro)propenyl and the like. Especially preferred residues have 1 or, respectively, 2 to 6 carbon atoms.

The term "halogen" includes fluorine, chlorine, bromine and iodine, but especially fluorine and chlorine.

Preferred isomerization/dimerization units of formula II are

II-A

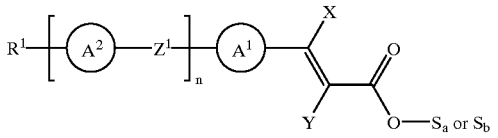

II-B

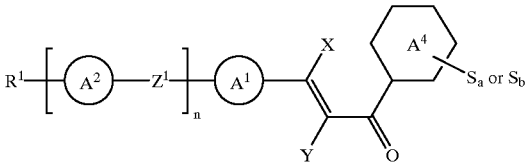

II-C

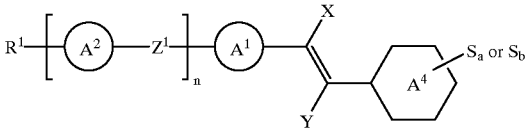

in which formulae II-A, II-B and II-C ring $A^1$ signifies 1,4-phenylene, which is unsubstituted or substituted with halogen, cyano and/or nitro, or pyrimidine-2,5-diyl, pyridine-2,5-diyl, 2,5-thiophenediyl, 2,5-furanylene, 1,4-naphthylene or 2,6-naphthylene;

ring $A^2$ signifies 1,4-phenylene, which is unsubstituted or substituted with halogen, cyano and/or nitro, or pyrimidine-2,5-diyl, pyridine-2,5-diyl, 2,5-thiophenediyl, 2,5-furanylene, trans-1,4-cyclohexylene, trans-1,3-dioxane-2,5-diyl or 1,4-piperidyl;

ring $A^4$ signifies 1,4-phenylene, which is unsubstituted or substituted with halogen, cyano and/or nitro;

$Z^1$ signifies a single covalent bond, —$CH_2CH_2$—, —COO—, —$OCH_2$—, —$(CH_2)_4$—, —$O(CH_2)_3$— or —$(CH_2)_3O$—;

$R^1$ signifies hydrogen, halogen, cyano, nitro, alkyl with 1 to 12 carbon atoms, which is optionally substituted with fluorine and in which optionally 1 or 2 non-adjacent —$CH_2$— groups can be replaced by oxygen or —COO— and/or a —$CH_2CH_2$— group can be replaced by —CH═CH—;

n signifies 0 or 1;

X signifies hydrogen or alkyl with 1 to 6 carbon atoms, which is optionally substituted with halogen;

Y signifies hydrogen, cyano, —COO-alkyl, alkyl with 1 to 6 carbon atoms, which is optionally substituted with fluorine; and $S_a$, $S_b$ signify spacer units;

with the proviso that in formula II-A simultaneously n does not signify 0, $A^1$ does not signify phenyl, $R^1$ does not signify hydrogen or methoxy, X and Y do not signify hydrogen and $S_a$ or $S_b$ does not signify a single bond.

Preferred compounds of formula II-A to II-C are those in which X signifies hydrogen and Y signifies hydrogen, cyano or alkyl with 1 to 6 carbon atoms, which is optionally substituted with fluorine; those in which X and Y represent hydrogen are, however, especially preferred.

Particularly preferred isomerization/dimerization units are those of formula II-A such as, for example, IIa

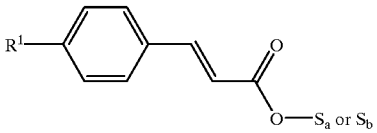

IIb

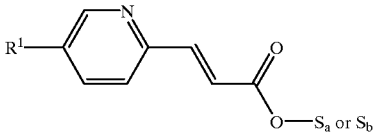

IIc

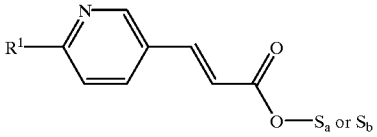

IId

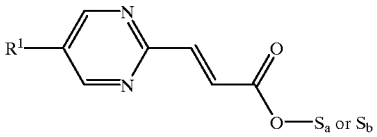

IIe

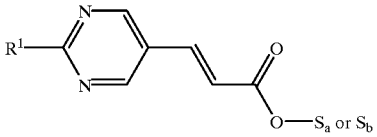

IIf

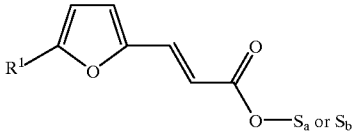

IIg

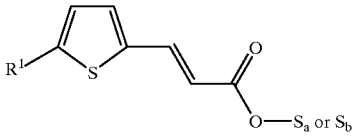

IIh

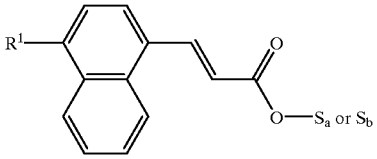

IIi

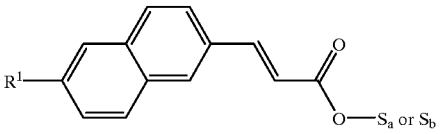

-continued

IIj

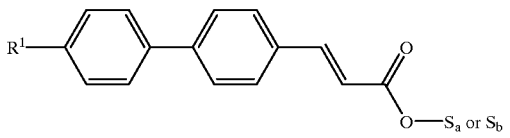

IIk

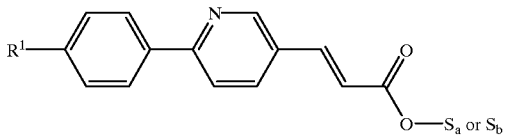

wherein $R^1$ signifies hydrogen, halogen, cyano, nitro, alkyl or alkoxy with 1 to 6 carbon atoms, with the proviso that in formula IIa simultaneously $R^1$ does not signify hydrogen or methoxy and $S_a$ or $S_b$ does not signify a single bond.

The polymers of formula I are readily accessible. The monomers are firstly synthesized from the individual components, that is from the isomerization/dimerization unit of formula II, the spacers ($S_a$, $S_b$) and the polymerizable parts ($M_a$, $M_b$ or $M_c$). The formation of the polymer is subsequently effected in a manner known per se. The polymerization can be effected, for example, in the melt or in solution with the exclusion of oxygen and in the presence of a radical initiator which can generate radicals thermally, photochemically or by a redox reaction. The reaction can be effected in a temperature range of −10° C. to 120° C., preferably in a range of 20° C. to 100° C.

For the production of polymer layers in regions selectively limited by area, a solution of the polymer material obtained can, for example, firstly be prepared and then spread out in a spin-coating apparatus on a carrier coated with an electrode (for example, a glass plate coated with indium-tin oxide) (ITC) such that homogeneous layers of 0.05–50 $\mu$m thickness result. Simultaneously, irradiation can be applied to the region to be isomerized and dimerized (to be crosslinked), for example with a mercury high-pressure lamp, a xenon lamp or a pulsed UV laser using a polarizer and optionally a mask for the formation of structures. The duration of irradiation depends on the capacity of the individual lamps and can vary from a few minutes to several hours. The cross-linkage can, however, also be effected by irradiating the homogeneous layer using filters which for example let through only radiation suitable for the cross-linkage reaction.

The polymers in accordance with the invention are illustrated in more detail by the following Examples. In the following Examples Tg signifies the glass temperature, $\Delta c_p$ signifies the change in the specific heat capacity at constant pressure, $\Delta H$ signifies the transition enthalpy, log $I_o/I$ signifies the extinction, $\epsilon$ signifies the molar decadic absorption coefficients, C signifies a crystalline phase, S signifies a smectic phase, N signifies a nematic phase and I signifies the isotropic phase.

EXAMPLE 1

1 g of methacryloyloxyethyl 3-(E)-[4-pentyl-4'-biphenyl] acrylate and 0.002 g of azobisisobutyronitrile were dissolved in 4 ml of tetrahydrofuran. The solution was flushed for 10 minutes with a weak nitrogen stream and the reaction vessel was subsequently closed air-tight. The solution was heated to 60° C. for 24 hours. Thereafter, the reaction vessel was opened and the solution was diluted with 5 ml of tetrahydrofuran while stirring. Subsequently, the diluted solution was added dropwise to 450 ml of diethyl ether while stirring at room temperature. The separated polymer was filtered off, dried, dissolved in 30 ml of dichlormethane and this solution was added dropwise to 450 ml of diethyl ether. This procedure was repeated twice. Filtration and drying at 50° C. in a vacuum gave 0.4 g of poly(methacryloyloxyethyl 3-(E)-[4-pentyl-4'-biphenyl]acrylate), Tg. 123° C., cl.p. (S-I) 160° C.;

The methacryloyloxyethyl 3-(E)-[4-pentyl-4'-biphenyl] acrylate used as the starting material was prepared as follows:

(a). A solution of 10 g of 4-pentyl-4'-cyanobiphenyl in 150 ml of toluene was treated dropwise at 0° C. with 65 ml of a 1M solution of diisobutylaluminium hydride in toluene while gassing with nitrogen. The reaction mixture was stirred at room temperature overnight, then treated dropwise with 340 ml of 1N sulphuric acid, stirred at room temperature for 1 hour, poured into 1,000 ml of water and then extracted three times with 100 ml of ethyl acetate each time. The combined organic phases were washed twice with 50 ml of saturated sodium chloride solution each time, dried over magnesium sulphate, filtered and subsequently concentrated. Chromatographic purification of the residue on silica gel with hexane/ethyl acetate (vol. 9:1) gave 10.1 g of 4-pentyl-4'-biphenylcarboxaldehyde.

(b). A mixture of 11.9 g of phosphonoacetic acid P,P-diethyltrimethylsilyl ester in 370 ml of absolute tetrahydrofuran was placed at 0° C. while gassing with nitrogen and then treated dropwise with 27.7 ml of a 1.6M solution of butyllithium in hexane. The reaction mixture was stirred at room temperature for 2 hours, then treated with a solution of 10.1 g of 4-pentyl-4'-biphenylcarboxaldehyde and 15 ml of absolute tetrahydrofuran, stirred at room temperature for a further 1.5 hours, poured into 100 ml of water and then extracted three times with 50 ml of ethyl acetate each time. The combined organic phases were washed twice with 50 ml of saturated sodium chloride solution each time, dried over magnesium sulphate, filtered and subsequently concentrated. Two-fold recrystallization of the crude product from ethyl alcohol gave 17.0 g of 3-(E)-[4-pentyl-4'-biphenyl]acrylic acid, m.p. (C-N) 209° C. and cl.p. (N-I) 284° C. (decompositon).

(c). 9.4 g of N,N'-dicyclohexylcarbodiimide were added at 0° C. within 15 minutes while stirring to a solution of 2-hydroxyethyl methacrylate, 11.6 g of 3-(E)-[4-pentyl-4'-biphenyl]acrylic acid and 1.21 g of 4-(dimethylamino)pyridine in 300 ml of tetrahydrofuran. The reaction mixture was stirred at room temperature overnight, then filtered, the filtrate was poured into water and extracted three times with 50 ml of ethyl acetate each time. The combined organic phases were washed twice with 50 ml of saturated sodium chloride solution each time, is dried over magnesium sulphate, filtered and subsequently concentrated. Chromatographic purification of the residue on silica gel with hexane/ethyl acetate (vol. 9:1) and two-fold recrystallization from ethyl alcohol of the fractions which were pure according to thin-layer chromotography gave 4.5 g of methacryloyloxyethyl 3-(E)-[4-pentyl-4'-biphenyl] acrylate, m.p. 72° C.

The following compounds can be prepared in an analogous manner:

Poly(methacryloyloxyethyl 3-(E)-[4-methyl-4'-biphenyl] acrylate);

poly(methacryloyloxyethyl 3-(E)-[4-ethyl-4'-biphenyl] acrylate);

poly(methacryloyloxyethyl 3-(E)-[4-propyl-4'-biphenyl] acrylate);
poly(methacryloyloxyethyl 3-(E)-[4-butyl-4'-biphenyl] acrylate);
poly(methacryloyloxyethyl 3-(E)-[4-hexyl-4'-biphenyl] acrylate);
poly(methacryloyloxyethyl 3-(E)-[4-heptyl-4'-biphenyl] acrylate);
poly(methacryloyloxyethyl 3-(E)-[4-octyl-4'-biphenyl] acrylate);
poly(methacryloyloxypropyl 3-(E)-[4-pentyl-4'-biphenyl] acrylate);
poly(methacryloyloxybutyl 3-(E)-[4-pentyl-4'-biphenyl] acrylate);
poly(methacryloyloxypentyl 3-(E)-[4-pentyl-4'-biphenyl] acrylate);
poly(methacryloyloxyhexyl 3-(E)-[4-pentyl-4'-biphenyl] acrylate);
poly(methacryloyloxyethyl 3-(E)-[4-methyloxy-4'-biphenyl]acrylate);
poly(methacryloyloxyethyl 3-(E)-[4-ethoxy-4'-biphenyl] acrylate);
poly(methacryloyloxyethyl 3-(E)-[4-propyloxy-4'-biphenyl] acrylate);
poly(methacryloyloxyethyl 3-(E)-[4-butyloxy-4'-biphenyl] acrylate);
poly(methacryloyloxyethyl 3-(E)-[4-hexyloxy-4'-biphenyl] acrylate);
poly(methacryloyloxyethyl 3-(E)-[4-heptyloxy-4'-biphenyl] acrylate);
poly(methacryloyloxyethyl 3-(E)-[4-octyloxy-4'-biphenyl] acrylate), Tg. 106° C., (S-I) 170° C.;
poly(methacryloyloxypropyl 3-(E)-[4-octyloxy-4'-biphenyl] acrylate);
poly(methacryloyloxybutyl 3-(E)-[4-octyloxy-4'-biphenyl] acrylate);
poly(methacryloyloxypentyl 3-(E)-[4-octyloxy-4'-biphenyl] acrylate);
poly(methacryloyloxyhexyl 3-(E)-[4-octyloxy4'-biphenyl] acrylate);
poly(methacryloyloxyethyl 3-(E)-[4-cyano-4'-biphenyl] acrylate), Tg. 134° C.;
poly(methacryloyloxypropyl 3-(E)-[4-cyano-4'-biphenyl] acrylate);
poly(methacryloyloxybutyl 3-(E)-[4-cyano-4'-biphenyl] acrylate);
poly(acryloyloxybutyl 3-(E)-[4-[(R)-2-octyloxy]-4'-biphenyl]acrylate);
poly(methacryloyloxypentyl 3-(E)-[4-cyano-4'-biphenyl] acrylate);
poly(methacryloyloxyhexyl 3-(E)-[4-cyano-4'-biphenyl] acrylate);
poly(methacryloyloxyethyl 3-(E)-[4-(trans-4-methylcyclohexyl)phenyl]acrylate);
poly(methacryloyloxyethyl 3-(E)-[4-(trans-4-ethylcyclohexyl)phenyl]acrylate);
poly(methacryloyloxyethyl 3-(E)-[4-(trans-4-propylcyclohexyl)phenyl]acrylate), Tg. 88°;C.
poly(methacryloyloxyethyl 3-(E)-[4-(trans-4-butylcyclohexyl)phenyl]acrylate);
poly(methacryloyloxyethyl 3-(E)-[4-(trans-4-pentylcyclohexyl)phenyl]acrylate);
poly(methacryloyloxyethyl 3-(E)-[4-(trans-4-hexylcyclohexyl)phenyl]acrylate);
poly(methacryloyloxyethyl 3-(E)-[4-(trans-4-heptylcyclohexyl)phenyl]acrylate);
poly(methacryloyloxypropyl 3-(E)-[4-(trans-4-pentylcyclohexyl)phenyl]acrylate);
poly(methacryloyloxybutyl 3-(E)-[4-(trans-4-pentylcyclohexyl)phenyl]acrylate);
poly(methacryloyloxypentyl 3-(E)-[4-(trans-4-pentylcyclohexyl)phenyl]acrylate);
poly(methacryloyloxyhexyl 3-(E)-[4-(trans-4-pentylcyclohexyl)phenyl]acrylate).
poly(methacryloyloxyethyl 3-(E)-biphenylacrylate), $T_g$=98° C.;
poly(methacryloyloxypropyl 3-(E)-biphenylacrylate);
poly(methacryloyloxyethyl 3-(E)-phenylacrylate), $T_g$=60° C.;
poly(methacryloyloxyethyl 3-(E)-[4-methylphenyl] acrylate);
poly(methacryloyloxyethyl 3-(E)-[4-ethylphenyl]acrylate);
poly(methacryloyloxyethyl 3-(E)-[4-methoxyphenyl] acrylate), $T_g$=69 ° C.;
poly(methacryloyloxyethyl 3-(E)-[4-ethoxyphenyl] acrylate);
poly(methacryloyloxypropyl 3-(E)-[4-methylphenyl] acrylate);
poly(methacryloyloxypropyl 3-(E)-[4-ethylphenyl] acrylate);
poly(methacryloyloxypropyl 3-(E)-[4-methoxyphenyl] acrylate);
poly(methacryloyloxypropyl 3-(E)-[4-ethoxyphenyl] acrylate);
poly(methacryloyloxyethyl 3-(E)-[3-cyanophenyl]acrylate);
poly(methacryloyloxypropyl 3-(E)-[3-cyanophenyl] acrylate);
poly(methacryloyloxyethyl 3-(E)-[4-cyanophenyl]acrylate), $T_g$=105° C.;
poly(methacryloyloxypropyl 3-(E)-[4-cyanophenyl] acrylate);
poly(methacryloyloxyethyl 3-(E)-[3-nitrophenyl]acrylate);
poly(methacryloyloxypropyl 3-(E)-[3-nitrophenyl] acrylate);
poly(methacryloyloxyethyl 3-(E)-[4-nitrophenyl]acrylate), $T_g$=106° C.;
poly(methacryloyloxypropyl 3-(E)-[4-nitrophenyl] acrylate);
poly(methacryloyloxyethyl 3-(E)-[3-chlorophenyl] acrylate);
poly(methacryloyloxypropyl 3-(E)-[3-chlorophenyl] acrylate);
poly(methacryloyloxyethyl 3-(E)-[4-chlorophenyl] acrylate), $T_g$=72° C.;
poly(methacryloyloxypropyl 3-(E)-[4-chlorophenyl] acrylate);
poly(methacryloyloxyethyl 3-(E)-[3-fluorophenyl]acrylate);
poly(methacryloyloxyethyl 3-(E)-[4-fluorophenyl]acrylate);
poly(methacryloyloxypropyl 3-(E)-[4-fluorophenyl] acrylate);
poly(methacryloyloxyethyl 3-(E)-[2,4-dimethylphenyl] acrylate);
poly(methacryloyloxypropyl 3-(E)-[2,4-dimethylphenyl] acrylate);
poly(methacryloyloxyethyl 3-(E)-[2,3-dimethoxyphenyl] acrylate);
poly(methacryloyloxyethyl 3-(E)-[2,4-dimethoxyphenyl] acrylate);
poly(methacryloyloxypropyl 3-(E)-[2,4-dimethoxyphenyl] acrylate);
poly (methacryloyloxyethyl 3-(E)-[3,4-dimethoxyphenyl] acrylate);
poly (methacryloyloxypropyl 3-(E)-[3,4-dimethoxyphenyl] acrylate);
poly(methacryloyloxyethyl 3-(E)-[3,5-dimethoxyphenyl] acrylate);

poly(methacryloyloxypropyl 3-(E)-[3,5-dimethoxyphenyl] acrylate);
poly(methacryloyloxyethyl 3-(E)-[3,4-dicyanophenyl] acrylate);
poly(methacryloyloxypropyl 3-(E)-[3,4-dicyanophenyl] acrylate);
poly(methacryloyloxyethyl 3-(E)-[3,5-dicyanophenyl] acrylate);
poly(methacryloyloxypropyl 3-(E)-[3,5-dicyanophenyl] acrylate);
poly(methacryloyloxyethyl 3-(E)-[2,4-dinitrophenyl] acrylate);
poly(methacryloyloxypropyl 3-(E)-[2,4-dinitrophenyl] acrylate);
poly(methacryloyloxyethyl 3-(E)-[3,4-dichlorophenyl] acrylate);
poly(methacryloyloxypropyl 3-(E)-[3,4-dichlorophenyl] acrylate);
poly(methacryloyloxyethyl 3-(E)-[3,5-dichlorophenyl] acrylate);
poly(methacryloyloxypropyl 3-(E)-[3,5-dichlorophenyl] acrylate);
poly(methacryloyloxyethyl 3-(E)-[3,4-difluorophenyl] acrylate);
poly(methacryloyloxypropyl 3-(E)-[3,4-difluorophenyl] acrylate);
poly(methacryloyloxyethyl 3-(E)-[3,5-difluorophenyl] acrylate);
poly(methacryloyloxypropyl 3-(E)-[3,5-difluorophenyl] acrylate);
poly(methacryloyloxyethyl 3-(E)-[3-bromo-4-fluorophenyl] acrylate);
poly(methacryloyloxypropyl 3-(E)-[3-bromo-4-fluorophenyl]acrylate);
poly(methacryloyloxyethyl 3-(E)-[5-bromo-2-methoxyphenyl]acrylate);
poly(methacryloyloxyethyl 3-(E)-[4-chloro 3-nitrophenyl] acrylate);
poly(methacryloyloxypropyl 3-(E)-[4-chloro 3-nitrophenyl] acrylate);
poly(methacryloyloxyethyl 3-(E)-[2-chloro-4-fluorophenyl] acrylate);
poly(methacryloyloxypropyl 3-(E)-[2-chloro-4-fluorophenyl]acrylate);
poly(methacryloyloxyethyl 3-(E)-[3-chloro-4-fluorophenyl] acrylate);
poly(methacryloyloxypropyl 3-(E)-[3-chloro-4-fluorophenyl]acrylate);
poly(methacryloyloxyethyl 3-(E)-[3-fluoro-2-methylphenyl]acrylate);
poly(methacryloyloxypropyl 3-(E)-[3-fluoro-2-methylphenyl]acrylate);
poly(methacryloyloxyethyl 3-(E)-[4-trifluoromethylphenyl] acrylate);
poly(methacryloyloxypropyl 3-(E)-[4-trifluoromethylphenyl]acrylate);
poly(methacryloyloxyethyl 3-(E)-[4-trifluoromethoxyphenyl]acrylate);
poly(methacryloyloxypropyl 3-(E)-[4-trifluoromethoxyphenyl]acrylate);
poly(acryloyloxyethyl 3-(E)-biphenylacrylate);
poly(2-chloroacryloyloxyethyl 3-(E)-[4-methylphenyl] acrylate);
poly(acryloyloxyethyl 3-(E)-[4-methoxyphenyl]acrylate);
poly(acryloyloxypropyl 3-(E)-[4-ethoxyphenyl]acrylate);
poly(acryloyloxyethyl 3-(E)-[3-cyanophenyl]acrylate);
poly(acryloyloxypropyl 3-(E)-[4-cyanophenyl]acrylate);
poly(2-chloroacryloyloxyethyl 3-(E)-[3-nitrophenyl] acrylate);
poly(acryloyloxyethyl 3-(E)-[4-nitrophenyl]acrylate);
poly(acryloyloxybutyl 3-(E)-[3-chlorophenyl]acrylate);
poly(acryloyloxyethyl 3-(E)-[4-chlorophenyl]acrylate);
poly(acryloyloxyethyl 3-(E)-[3-fluorophenyl]acrylate);
poly(2-chloroacryloyloxypentyl 3-(E)-[4-fluorophenyl] acrylate);
poly(acryloyloxyethyl 3-(E)-[2,4-dimethylphenyl]acrylate);
poly(acryloyloxyethyl 3-(E)-[3,4-dimethoxyphenyl] acrylate);
poly(acryloyloxyethyl 3-(E)-[3,5-dimethoxyphenyl] acrylate);
poly(2-chloroacryloyloxypropyl 3-(E)-[3,4-dicyanophenyl] acrylate);
poly(acryloyloxyethyl 3-(E)-[3,5-dicyanophenyl]acrylate);
poly(acryloyloxybutyl 3-(E)-[2,4-dinitrophenyl]acrylate);
poly(acryloyloxypentyl 3-(E)-[3,4-dichlorophenyl] acrylate);
poly(acryloyloxyethyl 3-(E)-[3,5-dichlorophenyl]acrylate);
poly(acryloyloxyethyl 3-(E)-[3,4-difluorophenyl]acrylate);
poly(acryloyloxypropyl 3-(E)-[3,5-difluorophenyl] acrylate);
poly(acryloyloxyethyl 3-(E)-[4-chloro 3-nitro-phenyl] acrylate);
poly(2-chloroacryloyloxypropyl 3-(E)-[2-chloro-4-fluorophenyl]acrylate);
poly(acryloyloxyethyl 3-(E)-[3-chloro-4-fluoro-phenyl] acrylate);
poly(acryloyloxyhexyl 3-(E)-[3-fluoro-2-methyl-phenyl] acrylate);
poly(acryloyloxyethyl 3-(E)-[4-trifluoromethylphenyl] acrylate);
poly(acryloyloxyethyl 3-(E)-[4-trifluoromethoxyphenyl] acrylate).

EXAMPLE 2

1.5 g of 4-methacryloyloxybutyl (E)-3-[4-(4-methoxyphenyl carbonyloxy)phenyl]acrylate and 0.003 g of azobisisobutyronitrile were dissolved in 6.8 ml of tetrahydrofuran. The solution was flushed for 10 minutes with a weak argon stream and subsequently the reaction vessel was closed air-tight. The solution was heated to 60° C. for 20 hours. Thereafter, the reaction vessel was opened and the solution was diluted with 3.5 ml of tetrahydrofuran while stirring. Subsequently, the diluted solution was added dropwise to 300 ml of diethyl ether at room temperature while stirring. The separated polymer was filtered off, dried, dissolved in 10 ml of dichlormethane and this solution was added dropwise to 300 ml of diethyl ether. This procedure was repeated twice. Filtration and drying at 50° C. in a vacuum gave 1.15 g of poly(4-methacryloyloxybutyl (E)-3-[4-(4-methoxyphenylcarbonyloxy)phenyl]acrylate). The polymer has a glass stage at Tg=38° C. ($\Delta c_p$=0.17 J/gK) and a clearing point ($S_A$-I) at 202° C. ($\Delta H$=6.9 J/g).

The 4-methacryloyloxybutyl (E)-3-[4-(4-methoxyphenylcarbonyloxy)phenyl]acrylate used as the starting material was prepared as follows:

a) 5 g of (E)-4-hydroxycinnamic acid were dissolved in a solution of 2.8 g of potassium hydroxide in 25 ml of water. Four 1 g portions of ethyl chloroformate were added to the ice-cooled solution and the mixture was stirred intensively for 10 minutes after each addition. The reaction mixture was stirred at 0° C. for a further 30 minutes and subsequently neutralized with 2N hydrochloric acid. The crude product was filtered off and recrystallised twice from ethanol/water (vol. 8:2).

This gave 5.7 g of 4-(E)-ethyloxycarbonyloxycinnamic acid, m.p. 173°–176° C.

b) A solution of 5.2 g of 4-(E)-ethyloxycarbonyloxycinnamic acid in 20 ml of thionyl chloride and 0.05 ml of N,N-dimethylformamide was heated under reflux for 3 hours. Subsequently, excess thionyl chloride was distilled off. 3.3 g of 4-hydroxybutyl methacrylate were added dropwise to a solution of the resulting 4-(E)-ethyloxycarbonyloxycinnamoyl chloride in 15 ml of pyridine while stirring at 0° C. within 15 minutes. The reaction mixture was stirred at room temperature for a further 12 hours, then poured into water and extracted three times with 50 ml of ethyl acetate each time. The combined organic phases were dried over magnesium sulphate, filtered and subsequently concentrated. Chromatographic purification on silica gel with hexane/ethyl acetate (vol. 7:3) gave 3 g of 4-methacryloyloxybutyl (E)-3-(4-ethoxycarbonyloxyphenyl)acrylate, m.p. 54°–56° C.

c) 5 g of 4-methacryloyloxybutyl (E)-3-(4-ethoxycarbonyloxyphenyl)acrylate were dissolved in 40 ml of pyridine and treated at room temperature with a mixture of 60 ml of acetone and 7 ml of 25% aqueous ammonia solution. The reaction mixture was stirred at room temperature for 12 hours. After distillation of the acetone the mixture was neutralized with 2N hydrochloric acid, diluted with 100 ml of water and subsequently extracted 3 times with 100 ml of diethyl ether each time. The combined organic phases were dried over sodium sulphate, filtered and concentrated. Chromatographic purification of the residue on silica gel with hexane/ethyl acetate (vol. 7:3) gave 4-methacryloyloxybutyl (E)-3-(4-hydroxyphenyl) acrylate.

d) 2.0 g of 4-methoxybenzoyl chloride in 25 ml of dichlormethane were added dropwise at 0° C. while stirring within 30 min. to a solution of 3.5 g of 4-methacryloyloxybutyl (E)-3-(4-hydroxyphenyl) acrylate and 1.2 g of triethylamine in 40 ml of dichloromethane. The reaction mixture was stirred at room temperature overnight, then filtered and subsequently concentrated. Chromatographic purification of the residue on silica gel with hexane/ethyl acetate (vol. 7:3) and two-fold recrystallization from ethanol gave 4.5 g of 4-methacryloyloxybutyl (E)-3-[4-(4-methoxyphenylcarbonyloxy)phenyl]acrylate, m.p. 89°–90° C.

The following compounds can be prepared in analogous manner:

poly(methacryloyloxyethyl 3-(E)-[4-(4-methoxybenzoyloxy)phenyl]acrylate);

poly(methacryloyloxyethyl 3-(E)-[4-(4-ethoxybenzoyloxy) phenyl]acrylate);

poly(methacryloyloxyethyl 3-(E)-[4-(4-propoxybenzoyloxy)phenyl]acrylate);

poly(methacryloyloxyethyl 3-(E)-[4-(4-butyloxybenzoyloxy)phenyl]acrylate);

poly(methacryloyloxyethyl 3-(E)-[4-(4-pentyloxybenzoyloxy)phenyl]acrylate);

poly(methacryloyloxyethyl 3-(E)-[4-(4-hexyloxybenzoyloxy)phenyl]acrylate);

poly(methacryloyloxyethyl 3-(E)-[4-(4-heptyloxybenzoyloxy)phenyl]acrylate);

poly(methacryloyloxyethyl 3-(E)-[4-(4-octyloxybenzoyloxy)phenyl]acrylate);

poly(methacryloyloxypropyl 3-(E)-[4-(4-methoxybenzoyloxy)phenyl]acrylate);

poly(methacryloyloxypentyl 3-(E)-[4-(4-methoxybenzoyloxy)phenyl]acrylate);

poly(methacryloyloxyhexyl 3-(E)-[4-(4-methoxybenzoyloxy)phenyl]acrylate);

poly(methacryloyloxyethyl 3-(E)-[4-(4-[(S)-2-methylbutyloxy]benzoyloxy)phenyl]acrylate);

poly(acryloyloxybutyl 3-(E)-[4-(4-methoxybenzoyloxy) phenyl]acrylate).

EXAMPLE 3

2.5 g of methacryloyloxyethyl (E)-3-(4-methoxyphenyl)-acrylate) and 2.5 g of 2-methacryloyloxyethyl (E)-3-(4-chlorophenyl)acrylate as well as 0.014 g of azobisisobutyronitrile were dissolved in 35 ml of tetrahydrofuran. The solution was flushed for 10 minutes with a weak argon stream and the reaction vessel was subsequently closed air-tight. The solution was heated to 60° C. for 24 hours. Thereafter, the reaction vessel was opened and the solution was diluted with 7.5 ml of tetrahydrofuran while stirring. Subsequently, the diluted solution was added dropwise to 500 ml of diethyl ether while stirring at room temperature. The separated polymer was filtered off, dried, dissolved in 40 ml of dichloromethane and this solution was added dropwise to 500 ml of diethyl ether. This procedure was repeated twice. Filtration and drying at 50° C. in a vacuum gave 3.8 g of poly(2-methacryloyloxyethyl (E)-3-(4-methoxyphenyl)acrylate-co-2-methacryloyloxyethyl (E)-3-(4-chlorophenyl)acrylate). The polymer has a glass stage at Tg=74° C. $\lambda_{max.}$ (0.586 mg/100 ml $CH_2Cl_2$): 227 nm, (log $I_o/I$)=0.213), 287.8 nm, (log $I_o/I$=0.367).

The monomers used as the starting materials were prepared as follows:

50 g of 4-(E)-chlorocinnamic acid, 33.9 g of 2-hydroxyethylmethacrylate and 0.3 g of 4-dimethylaminopyridine were placed in 200 ml of tetrahydrofuran. A solution of 57.2 g of dicyclohexylcarbodiimide in 100 ml of tetrahydrofuran was added dropwise at room temperature within 120 minutes. The mixture was stirred at room temperature for a further 28 hours. Subsequently, the precipitated N,N'-dicyclohexylurea was filtered off and washed with 100 ml of tetrahydrofuran. After distillation of the tetrahydrofuran the residue was dissolved in 300 ml of dichloromethane. The dichloromethane solution was washed with 200 ml of 5% acetic acid and subsequently three times with 250 ml of water each time and dried over sodium sulphate. After removing the solvent the residue was recrystallized from ethanol at −50° C. This gave 20.4 g of 2methacryloyloxyethyl (E)-3-(4-chlorphenyl)acrylate as white crystals with a melting point of 58°–60° C.

2-Methacryloyloxyethyl (E)-3-(4-methoxyphenyl)-acrylate with a melting point of 35°–36° C. was prepared analogously thereto.

The following polymers can be prepared in an analogous manner:

Poly(2-methacryloyloxyethyl (E)-3-(4-methoxyphenyl) acrylate-co-2-methacryloyloxyethyl (E)-3-(4-nitrophenyl)acrylate), $T_g$=89° C.;

poly(2-methacryloyloxyethyl (E)-3-(4-cyanophenyl) acrylate-co-2-methacryloyloxyethyl (E)-3-(4-methoxyphenyl)acrylate);

poly(2-methacryloyloxyethyl (E)-3-(4-methoxyphenyl) acrylate-co-2-acryloyloxyethyl (E)-3-(4-nitrophenyl) acrylate);

poly(2-methacryloyloxypropyl (E)-3-(4-cyanophenyl) acrylate-co-2-methacryloyloxyhexyl (E)-3-(4-cyanophenyl)acrylate);

poly(2-acryloyloxyethyl (E)-3-(4-methoxyphenyl)acrylate-co-2-methacryloyloxyethyl (E)-3-(4-nitrophenyl) acrylate);

poly(acryloyloxybutyl (E)-3-(4-cyanophenyl)acrylate-co-2-methacryloyloxyethyl (E)-3-(4-methoxyphenyl)-(Z)-3-methylacrylate);

poly(acryloyloxybutyl (E)-3-(4-methoxyphenyl)-2-carboxyethyl-acrylate-co-acryloyloxybutyl (Z)-3-(4-methoxyphenyl)-2-carboxyethyl-acrylate);

poly(styryl-4-carbonyloxyhexyl (E)-3-(4-cyanophenyl) acrylate-co-styryl-4-carbonyloxyhexyl (E)-3-(4-methoxyphenyl)acrylate);

poly(2-methacryloyloxyethyl (E)-3-(4-cyanophenyl) acrylate-co-2-methacryloyloxyethyl (E)-3-(4-methoxyphenyl)acrylate);

poly(2-chloroacryloyloxyethyl (E)-3-(4-chlorophenyl) acrylate-co-2-chloroacryloyloxyethyl (E)-3-(4-methoxyphenyl)acrylate);

poly(2-methacrylamidoethyl (E)-3-(4-cyanophenyl) acrylate-co-2-methacrylamidobutyl-3 (E)-[4-propyloxy-4'-biphenyl]acrylate]);

poly(2-chloroacrylamidohexyl (E)-3-(4-cyano-4°-biphenyl) acrylate-co-2-chloroacrylamidohexyl 3 (E)-[4-methyloxyphenyl]acrylate]);

poly(acrylamidomethyl (E)-3-(4-butyloxyphenyl)acrylate-co-acrylamidobutyl-3 (E)-[4-butyloxy-4'-biphenyl] acrylate]);

poly(2-methacrylamidoethyl (E)-3-(4-octyloxy-4'-biphenyl) acrylate-co-2-acrylamidobutyl 3-(E)-{4-[(R)-2-octyloxy]-4'-biphenyl}acrylate]);

poly(2-methacryloyloxybutyl (E)-3-(4-ethyloxyphenyl)-(Z)-3-methyl-acrylate-co-2-methacryloyloxyethyl (E)-3-(4-methoxy-4'-biphenyl)-2-cyanoacrylate);

poly(methacryloyloxybutyl-3 (E)-[4-(trans-4-butylcyclohexyl)phenyl]-3-(Z)-methylacrylate-co-styrene);

poly(acryloyloxyethyl-3 (E)-[4-octyloxy-4'-biphenyl] acrylate-co-methyl acrylate);

poly(ethyl methacrylate-co-methacryloyloxyethyl-3 (E)-[4-(4-propoxybenzoyloxy)phenyl]acrylate);

poly(methacrylamidoethyl (E)-3-(4-proyloxyphenyl) acrylate-co-methyl methacrylamide);

poly(2-chloroacryloyloxyhexyl-3 (E)-[4-(trans-4-methylcyclohexyl)phenyl]acrylate-co-methyl 2-chloroacrylate);

poly(2-chloroacryloyloxypentyl (E)-3-(4-methoxy-4'-biphenyl)-2-carboxyethyl-acrylate-co-2-chloroacryloyloxybutyl-(Z)-3-(4-methoxy-4'-biphenyl)-2-carboxyethyl-acrylate-co-methyl 2chloroacrylate);

poly(ethyl 2-methacrylate-co-2-methacryloyloxypropyl (E)-3-(4-pentyloxyphenyl)acrylate-co-2-methacryloyloxybutyl (E)-3-(4-[(S)-2-methylbutyloxy]-4'-biphenyl)-2-carboxyethyl-acrylate);

poly(methacryloyloxypropyl-3 (E)-[4-(trans-4-butylcyclohexyl)phenyl]-3-(Z)-methylacrylate-co-2-methacryloyloxypropyl (E)-3-(4-(R)-2-octyloxy]phenyl)-3-(Z)-methylacrylate-co-styrene).

EXAMPLE 4

2.4 g of but-3-ene 3-phenylacrylate and 0.6 g of poly (methylhydrogen-siloxane) were dissolved in 8 mi of toluene (thiophene-free). The solution was flushed through a septum on the reaction vessel for 10 minutes with a weak argon stream. Subsequently, 20 $\mu$l of a platinum-divinyltetramethyldisiloxane solution (mfr. PETRARCH SYSTEMS, PC075) were sprayed into the reaction mixture at room temperature while stirring. The reaction mixture was stirred at room temperature for 30 minutes and at 60° C. for 18 hours. Subsequently, the reaction mixture was added dropwise to 200 ml of n-hexane while stirring. The precipitated polymer was separated, dissolved in 10 ml of toluene and again precipitated in 200 ml of n-hexane. This procedure was repeated twice. Drying in a high vacuum gave 1.8 g of poly[(butyl-3-phenylacrylate)-methylsiloxane] with a glass stage $T_g$=−25° C., $\Delta c_p$=0.31 J/gK.

The but-3-ene 3-phenylacrylate used as the starting material was prepared as follows:

22.2 g of cinnamic acid, 12.5 g of but-3-en-1-al and 0.2 g of 4-N,N-dimethylaminopyridine were placed in 80 ml of dichloromethane. A solution of 33.05 g of dicyclohexylcarbodiimide in 80 ml of dichloromethane was added dropwise at 5°–10° C. within 120 minutes. The mixture was stirred at room temperature for a further 18 hours. Subsequently, the precipitated N,N'-dicyclohexylurea was filtered off and washed with 150 ml of dichloromethane. The dichloromethane solution was washed with 200 ml of 5% acetic acid and subsequently three times with 250 ml of water each time, filtered and dried over sodium sulphate. After concentrating the solution the residue was chromatographed on silica gel with dichloromethane. Drying in a high vacuum gave 22.1 g of but-3-ene 3-phenylacrylate as a colourless liquid.

The following compounds can be prepared in an analogous manner:

Poly(methyl-[propyl-3-(E)-(4-methyloxy-4'-biphenyl) acrylate siloxane);

poly(methyl-{pentyl-3-(E)-[4-(trans-4-propylcyclohexyl) phenyl]acrylate}siloxane);

poly(methyl-{hexyl-3-(E)-[4-(4-methoxybenzoyl)phenyl] acrylate}siloxane);

1,3,5,7-tetra[butyl-3-(E)-(4-methoxy-4'-biphenyl) acrylate]-1,3,5,7-tetramethyl-cyclotetrasiloxane;

poly(methyl-[butyl-3-(E)-(4-methyloxyphenyl)acrylate] siloxane);

poly (methyl-[butyl-(E)-3-(4-methoxyphenyl)acrylate] siloxane-co-methyl-[propyl-3-(E)-[4-ethyloxy-4'-biphenyl]acrylate]siloxane);

poly(dimethylsiloxane-co-methyl-[butyl-3-(E)-[4-methyloxy-4'-biphenyl]acrylate]siloxane);

poly(dimethylsiloxane-co-methyl-[propyl-(E)-3-(4-methoxyphenyl)-2-carboxyethyl-acrylate]siloxane-co-methyl-[propyl-3-(Z)-[4-methyloxyphenyl)-2-carboxyethyl-acrylate]siloxane);

poly(dimethylsiloxane-co-methyl-[octyl-3-(E)-(4-methyloxy-4'-biphenyl)acrylate]siloxane-co-[pentyl-(E)-3-(4-methoxyphenyl)acrylate]siloxane).

EXAMPLE 5

1.5 g of (E)-3-(4-cyano-phenyl)-N-[3-(2-methyl-acryloylamino)propyl]acrylamide and 0.0083 g of azobisisobutyronitrile were dissolved in 10 ml of N,N-dimethylformamide. The solution was flushed for 10 minutes with a weak argon stream. Subsequently, the reaction vessel was closed air-tight. The solution was heated to 70° C. for 16 hours. Thereafter, the reaction vessel was opened and the solution was added dropwise while stirring to 300 ml of diethyl ether at room temperature. The separated polymer was filtered off, dried, dissolved in 10 ml of N,N-dimethylformamide and this solution was again added dropwise to 300 ml of diethyl ether. This procedure was repeated twice. Filtration and drying at 50° C. in a vacuum gave 0.54 g of poly(3-methacryloylaminopropyl (E)-3-[4-cyano-phenyl]acrylamide). The polymer has a glass stage at $T_g$=165° C. ($\Delta c_p$=0.46 J/gK).

The (E)-3-(4-cyano-phenyl)-N-[3-(2-methyl-acryloylamino)propyl]-acrylamide used at the starting material was prepared at follows:

4.12 g of 4-cyano-cinnamic acid were suspended in 35 ml of methylene chloride and gassed for 10 min. with a weak argon stream. After cooling to −15° C. 3.8 ml of diphenylphosphinic acid chloride and 3.3 ml of triethylamine were added dropwise in succession while stirring. Subsequently, a suspension consisting of 4.25 g of N-(3aminopropyl)methacrylamide hydrochloride and 6.6 ml of triethylamine in 40 ml of tetrahydrofuran were slowly added to this reaction mixture. The reaction mixture was stirred overnight, whereby the temperature rose to about 12° C. For the working-up, the reaction mixture was concentrated in a vacuum. The residue which remained behind was precipitated in 200 ml of water, filtered off and recrystallized from a mixture of 10 ml of ethanol and 30 ml of water. This gave 3.13 g of (E)-3-(4-cyano-phenyl)-N-[3-(2-methyl-acryloylamino)-propyl]-acrylamide. $\lambda_{max}$ (ethanol)=284.3 nm ($\epsilon$=32290 l $mol^{-1}$ $cm^{-1}$).

Having regard to Example 1b), the following compounds can be prepared in an analogous manner:

Poly(2-methacryloylaminoethyl (E)-3-[4-cyano-phenyl] acrylamide);
poly(2-methacryloylaminoethyl (E)-3-[3-cyano-phenyl] acrylamide);
poly(3-methacryloylaminopropyl (E)-3-[3-cyano-phenyl] acrylamide);
poly(2-methacryloylaminoethyl (E)-3-phenylacrylamide);
poly(2-methacryloylaminoethyl (E)-3-[4-methoxy-phenyl] acrylamide);
poly(3-methacryloylaminopropyl (E)-3-[4-methoxy-phenyl]acrylamide);
poly(2-methacryloylaminoethyl (E)-3-[4-ethoxy-phenyl] acrylamide);
poly(3-methacryloylaminopropyl (E)-3-[4-ethoxy-phenyl] acrylamide);
poly(2-methacryloylaminoethyl (E)-3-[4-methyl-phenyl] acrylamide);
poly(3-methacryloylaminopropyl (E)-3-[4-methyl-phenyl] acrylamide);
poly(2-methacryloylaminoethyl (E)-3-[4-ethyl-phenyl] acrylamide);
poly(3-methacryloylaminopropyl (E)-3-[4-ethyl-phenyl] acrylamide);
poly(2-methacryloylaminoethyl (E)-3-[4-trifluoromethyl-phenyl]acrylamide);
poly(3-methacryloylaminopropyl (E)-3-[4-trifluoromethyl-phenyl]acrylamide);
poly(2-methacryloylaminoethyl (E)-3-[4-trifluoromethoxy-phenyl]acrylamide);
poly(3-methacryloylaminopropyl (E)-3-[4-trifluoromethoxy-phenyl]acrylamide);
poly(2-methacryloylaminoethyl (E)-3-[3-nitro-phenyl] acrylamide);
poly(3-methacryloylaminopropyl (E)-3-[3-nitro-phenyl] acrylamide);
poly(2-methacryloylaminoethyl (E)-3-[4-nitro-phenyl] acrylamide);
poly(3-methacryloylaminopropyl (E)-3-[4-nitro-phenyl] acrylamide);
poly(2-methacryloylaminoethyl (E)-3-[2-chloro-phenyl] acrylamide);
poly(2-methacryloylaminoethyl (E)-3-[3-chloro-phenyl] acrylamide);
poly(2-methacryloylaminoethyl (E)-3-[4-chloro-phenyl] acrylamide);
poly(3-methacryloylaminopropyl (E)-3-[4-chloro-phenyl] acrylamide);
poly(3-methacryloylaminopropyl (E)-3-[3-fluoro-phenyl] acrylamide);
poly(2-methacryloylaminoethyl (E)-3-[4-fluoro-phenyl] acrylamide);
poly(3-methacryloylaminopropyl (E)-3-[4-fluoro-phenyl] acrylamide);
poly(2-methacryloylaminoethyl (E)-3-[2,4-dimethyl-phenyl]acrylamide);
poly(3-methacryloylaminopropyl (E)-3-[2,4-dimethyl-phenyl]acrylamide);
poly(3-methacryloylaminopropyl (E)-3-[2,3-dimethoxy-phenyl]acrylamide);
poly(2-methacryloylaminoethyl (E)-3-[2,4-dimethoxy-phenyl]acrylamide);
poly(3-methacryloylaminopropyl (E)-3-[2,4-dimethoxy-phenyl]acrylamide);
poly(2-methacryloylaminoethyl (E)-3-[3,4-dimethoxy-phenyl]acrylamide);
poly(3-methacryloylaminopropyl (E)-3-[3,4-dimethoxy-phenyl]acrylamide);
poly(2-methacryloylaminoethyl (E)-3-[3,5-dimethoxy-phenyl]acrylamide);
poly(3-methacryloylaminopropyl (E)-3-[3,5-dimethoxy-phenyl]acrylamide);
poly(2-methacryloylaminoethyl (E)-3-[3,4-dicyano-phenyl] acrylamide);
poly(3-methacryloylaminopropyl (E)-3-[3,4-dicyano-phenyl]acrylamide);
poly(2-methacryloylaminoethyl (E)-3-[3,5-dicyano-phenyl] acrylamide);
poly(3-methacryloylaminopropyl (E)-3-[3,5-dicyano-phenyl]acrylamide);
poly(2-methacryloylaminoethyl (E)-3-[2,4-dinitro-phenyl] acrylamide);
poly(3-methacryloylaminopropyl (E)-3-[2,4-dinitro-phenyl] acrylamide);
poly(2-methacryloylaminoethyl (E)-3-[3,4-dichloro-phenyl] acrylamide);
poly(3-methacryloylaminopropyl (E)-3-3,4-dichloro-phenyl]acrylamide);
poly(2-methacryloylaminoethyl (E)-3-[3,5-dichloro-phenyl] acrylamide);
poly(3-methacryloylaminopropyl (E)-3-[3,5-dichloro-phenyl]acrylamide);
poly(2-methacryloylaminoethyl (E)-3-[3,4-difluoro-phenyl] acrylamide);
poly(3-methacryloylaminopropyl (E)-3-[3,4-difluoro-phenyl]acrylamide);
poly(2-methacryloylaminoethyl (E)-3-[3,5-difluoro-phenyl] acrylamide);
poly(3-methacryloylaminopropyl (E)-3-[3,5-difluoro-phenyl]acrylamide);
poly(2-methacryloylaminoethyl (E)-3-[4-chloro-3-nitro-phenyl]acrylamide);
poly(3-methacryloylaminopropyl (E)-3-[4-chloro-3-nitro-phenyl]acrylamide);
poly(2-methacryloylaminoethyl (E)-3-[2-chloro-4-fluoro-phenyl]acrylamide);
poly(3-methacryloylaminopropyl (E)-3-[2-chloro-4-fluoro-phenyl]acrylamide);
poly(2-methacryloylaminoethyl (E)-3-[3-chloro-4-fluoro-phenyl]acrylamide);
poly(3-methacryloylaminopropyl (E)-3-[3-chloro-4-fluoro-phenyl]acrylamide);
poly(2-methacryloylaminoethyl (E)-3-[3-fluoro-2-methyl-phenyl]acrylamide);

poly(3-methacryloylaminopropyl (E)-3-[3-fluoro-2-methyl-phenyl]acrylamide);
poly(3-methacryloylaminopropyl (E)-3-biphenyl-acrylamide);
poly(2-methacryloylaminoethyl (E)-3-[4-methoxy-4'-biphenyl]acrylamide);
poly(3-methacryloylaminopropyl (E)-3-[4-methoxy-4'-biphenyl]acrylamide);
poly(2-methacryloylaminoethyl (E)-3-[4-cyano-4'-biphenyl]acrylamide);
poly(3-methacryloylaminopropyl (E)-3-[4-cyano-4'-biphenyl]acrylamide);
poly(2-methacryloylaminoethyl (E)-3-[4-(trans-4-methylcyclohexyl)phenyl]acrylamide);
poly(3-methacryloylaminopropyl (E)-3-[4-(trans-4-methyl-cyclohexyl)phenyl]acrylamide);
poly(2-methacryloyloxyethyl (E)-3-[4-cyano-phenyl] acrylamide);
poly(3-methacryloyloxypropyl (E)-3-[4-cyano-phenyl] acrylamide);
poly(2-methacryloyloxyethyl (E)-3-[3-cyano-phenyl] acrylamide);
poly(3-methacryloyloxypropyl (E)-3-[3-cyano-phenyl] acrylamide);
poly(2-methacryloyloxyethyl (E)-3-[4-methoxy-phenyl] acrylamide);
poly(3-methacryloyloxypropyl (E)-3-[4-methoxy-phenyl] acrylamide);
poly(2-methacryloyloxyethyl (E)-3-[4-ethoxy-phenyl] acrylamide);
poly(3-methacryloyloxypropyl (E)-3-[4-ethoxy-phenyl] acrylamide);
poly(2-methacryloyloxyethyl (E)-3-[4-methyl-phenyl] acrylamide);
poly(3-methacryloyloxypropyl (E)-3-[4-methyl-phenyl] acrylamide);
poly(2-methacryloyloxyethyl (E)-3-[4-ethyl-phenyl] acrylamide);
poly(2-methacryloyloxyethyl (E)-3-[4-trifluoromethyl-phenyl]acrylamide);
poly(3-methacryloyloxypropyl (E)-3-[4-trifluoromethyl-phenyl]acrylamide);
poly(2-methacryloyloxyethyl (E)-3-[4-trifluoromethoxy-phenyl]acrylamide);
poly(3-methacryloyloxypropyl (E)-3-[4-trifluoromethoxy-phenyl]acrylamide);
poly(3-methacryloyloxypropyl (E)-3-[3-nitro-phenyl] acrylamide);
poly(2-methacryloyloxyethyl (E)-3-[4-nitro-phenyl] acrylamide);
poly(3-methacryloyloxypropyl (E)-3-[4-nitro-phenyl] acrylamide);
poly(3-methacryloyloxypropyl (E)-3-[3-chloro-phenyl] acrylamide);
poly(2-methacryloyloxyethyl (E)-3-[4-chloro-phenyl] acrylamide);
poly(3-methacryloyloxypropyl (E)-3-[4-chloro-phenyl] acrylamide);
poly(2-methacryloyloxyethyl (E)-3-[3-fluoro-phenyl] acrylamide);
poly(3-methacryloyloxypropyl (E)-3-[3-fluoro-phenyl] acrylamide);
poly(2-methacryloyloxyethyl (E)-3-[4-fluoro-phenyl] acrylamide);
poly(3-methacryloyloxypropyl (E)-3-[4-fluoro-phenyl] acrylamide);
poly(2-methacryloyloxyethyl (E)-3-[2,4-dimethyl-phenyl] acrylamide);
poly(3-methacryloyloxypropyl (E)-3-[2,4-dimethyl-phenyl] acrylamide);
poly(2-methacryloyloxyethyl (E)-3-[2,4-dimethoxy-phenyl] acrylamide);
poly(3-methacryloyloxypropyl (E)-3-[2,4-dimethoxy-phenyl]acrylamide);
poly(2-methacryloyloxyethyl (E)-3-[3,4-dimethoxy-phenyl] acrylamide);
poly(3-methacryloyloxypropyl (E)-3-[3,4-dimethoxy-phenyl]acrylamide);
poly(2-methacryloyloxyethyl (E)-3-[3,5-dimethoxy-phenyl] acrylamide);
poly(3-methacryloyloxypropyl (E)-3-[3,5-dimethoxy-phenyl]acrylamide);
poly(2-methacryloyloxyethyl (E)-3-[3,4-dicyano-phenyl] acrylamide);
poly(3-methacryloyloxypropyl (E)-3-[3,4-dicyano-phenyl] acrylamide);
poly(2-methacryloyloxyethyl (E)-3-[3,5-dicyano-phenyl] acrylamide);
poly(3-methacryloyloxypropyl (E)-3-[3,5-dicyano-phenyl] acrylamide);
poly(2-methacryloyloxyethyl (E)-3-[2,4-dinitro-phenyl] acrylamide);
poly(3-methacryloyloxypropyl (E)-3-[2,4-dinitro-phenyl] acrylamide);
poly(2-methacryloyloxyethyl (E)-3-[3,4-dichloro-phenyl] acrylamide);
poly(3-methacryloyloxypropyl (E)-3-3,4-dichloro-phenyl] acrylamide);
poly(2-methacryloyloxyethyl (E)-3-[3,5-dichloro-phenyl] acrylamide);
poly(3-methacryloyloxypropyl (E)-3-[3,5-dichloro-phenyl] acrylamide);
poly(2-methacryloyloxyethyl (E)-3-[3,4-difluoro-phenyl] acrylamide);
poly(3-methacryloyloxypropyl (E)-3-[3,4-difluoro-phenyl] acrylamide);
poly(2-methacryloyloxyethyl (E)-3-[3,5-difluoro-phenyl] acrylamide);
poly(3-methacryloyloxypropyl (E)-3-[3,5-difluoro-phenyl] acrylamide);
poly(2-methacryloyloxyethyl (E)-3-[3-bromo-4-fluoro-phenyl]acrylamide);
poly(3-methacryloyloxypropyl (E)-3-[3-bromo-4-fluoro-phenyl]acrylamide);
poly(2-methacryloyloxyethyl (E)-3-[5-bromo-2-methoxy-phenyl]acrylamide);
poly(2-methacryloyloxyethyl (E)-3-[2-chloro-5-nitro-phenyl]acrylamide);
poly(3-methacryloyloxypropyl (E)-3-[2-chloro-5-nitro-phenyl]acrylamide);
poly(2-methacryloyloxyethyl (E)-3-[4-chloro-3-nitro-phenyl]acrylamide);
poly(3-methacryloyloxypropyl (E)-3-[4-chloro-3-nitro-phenyl]acrylamide);
poly(2-methacryloyloxyethyl (E)-3-[2-chloro-4-fluoro-phenyl]acrylamide);
poly(3-methacryloyloxypropyl (E)-3-[2-chloro-4-fluoro-phenyl]acrylamide);
poly(2-methacryloyloxyethyl (E)-3-[2-chloro-6-fluoro-phenyl]acrylamide);
poly(3-methacryloyloxypropyl (E)-3-[2-chloro-6-fluoro-phenyl]acrylamide);
poly(2-methacryloyloxyethyl (E)-3-[3-chloro-4-fluoro-phenyl]acrylamide);
poly(3-methacryloyloxypropyl (E)-3-[3-chloro-4-fluoro-phenyl]acrylamide);

poly(2-methacryloyloxyethyl (E)-3-[3-fluoro-2-methyl-phenyl]acrylamide);
poly(3-methacryloyloxypropyl (E)-3-[3-fluoro-2-methyl-phenyl]acrylamide);
poly(2-methacryloyloxyethyl (E)-3-biphenylacrylamide);
poly(2-methacryloyloxyethyl (E)-3-[4-methoxy-4'-biphenyl]acrylamide);
poly(3-methacryloyloxypropyl (E)-3-[4-methoxy-4'-biphenyl]acrylamide);
poly(2-methacryloyloxyethyl (E)-3-[4-cyano-4'-biphenyl] acrylamide);
poly(3-methacryloyloxypropyl (E)-3-[4-cyano-4'-biphenyl] acrylamide);
poly(2-methacryloyloxyethyl (E)-3-[4-(trans-4-methyl-cyclohexyl)phenyl]acrylamide);
poly(3-methacryloyloxypropyl (E)-3-[4-(trans-4-methyl-cyclohexyl)phenyl]acrylamide);
poly(2-methacryloylaminoethyl (E)-3-[4-cyano-phenyl] acrylate);
poly(3-methacryloylaminopropyl (E)-3-[4-cyano-phenyl] acrylate);
poly(2-methacryloylaminoethyl (E)-3-[3-cyano-phenyl] acrylate);
poly(3-methacryloylaminopropyl (E)-3-[3-cyano-phenyl] acrylate);
poly(2-methacryloylaminoethyl (E)-3-phenylacrylate);
poly(2-methacryloylaminoethyl (E)-3-[4-methoxy-phenyl] acrylate);
poly(3-methacryloylaminopropyl (E)-3-[4-methoxy-phenyl]acrylate);
poly(2-methacryloylaminoethyl (E)-3-[4-ethoxy-phenyl] acrylate);
poly(3-methacryloylaminopropyl (E)-3-[4-ethoxy-phenyl] acrylate);
poly(2-methacryloylaminoethyl (E)-3-[4-methyl-phenyl] acrylate);
poly(3-methacryloylaminopropyl (E)-3-[4-methyl-phenyl] acrylate);
poly(2-methacryloylaminoethyl (E)-3-[4-ethyl-phenyl] acrylate);
poly(3-methacryloylaminopropyl (E)-3-[4-ethyl-phenyl] acrylate);
poly(2-methacryloylaminoethyl (E)-3-[4-trifluoromethyl-phenyl]acrylate);
poly(3-methacryloylaminopropyl (E)-3-[4-trifluoromethyl-phenyl]acrylate);
poly(2-methacryloylaminoethyl (E)-3-[4-trifluoromethoxy-phenyl]acrylate);
poly(3-methacryloylaminopropyl (E)-3-[4-trifluoromethoxy-phenyl]acrylate);
poly(2-methacryloylaminoethyl (E)-3-[3-nitro-phenyl] acrylate);
poly(3-methacryloylaminopropyl (E)-3-[3-nitro-phenyl] acrylate);
poly(2-methacryloylaminoethyl (E)-3-[4-nitro-phenyl] acrylate);
poly(3-methacryloylaminopropyl (E)-3-[4-nitro-phenyl] acrylate);
poly(2-methacryloylaminoethyl (E)-3-[3-chloro-phenyl] acrylate);
poly(3-methacryloylaminopropyl (E)-3-[3-chloro-phenyl] acrylate);
poly(2-methacryloylaminoethyl (E)-3-[4-chloro-phenyl] acrylate);
poly(3-methacryloylaminopropyl (E)-3-[4-chloro-phenyl] acrylate);
poly(2-methacryloylaminoethyl (E)-3-[3-fluoro-phenyl] acrylate);
poly(3-methacryloylaminopropyl (E)-3-[3-fluoro-phenyl] acrylate);
poly(2-methacryloylaminoethyl (E)-3-[4-fluoro-phenyl] acrylate);
poly(3-methacryloylaminopropyl (E)-3-[4-fluoro-phenyl] acrylate);
poly(2-methacryloylaminoethyl (E)-3-[2,4-dimethyl-phenyl]acrylate);
poly(3-methacryloylaminopropyl (E)-3-[2,4-dimethyl-phenyl]acrylate);
poly(2-methacryloylaminoethyl (E)-3-[2,4-dimethoxy-phenyl]acrylate);
poly(3-methacryloylaminopropyl (E)-3-[2,4-dimethoxy-phenyl]acrylate);
poly(2-methacryloylaminoethyl (E)-3-[3,4-dimethoxy-phenyl]acrylate);
poly(3-methacryloylaminopropyl (E)-3-[3,4-dimethoxy-phenyl]acrylate);
poly(2-methacryloylaminoethyl (E)-3-[3,5-dimethoxy-phenyl]acrylate);
poly(3-methacryloylaminopropyl (E)-3-[3,5-dimethoxy-phenyl]acrylate);
poly(2-methacryloylaminoethyl (E)-3-[3,4-dicyano-phenyl] acrylate);
poly(3-methacryloylaminopropyl (E)-3-[3,4-dicyano-phenyl]acrylate);
poly(2-methacryloylaminoethyl (E)-3-[3,5-dicyano-phenyl] acrylate);
poly(3-methacryloylaminopropyl (E)-3-[3,5-dicyano-phenyl]acrylate);
poly(2-methacryloylaminoethyl (E)-3-[2,4-dinitro-phenyl] acrylate);
poly(3-methacryloylaminopropyl (E)-3-[2,4-dinitro-phenyl] acrylate);
poly(2-methacryloylaminoethyl (E)-3-[3,4-dichloro-phenyl] acrylate);
poly(3-methacryloylaminopropyl (E)-3-3,4-dichloro-phenyl]acrylate);
poly(2-methacryloylaminoethyl (E)-3-[3,5-dichloro-phenyl] acrylate);
poly(3-methacryloylaminopropyl (E)-3-[3,5-dichloro-phenyl]acrylate);
poly(2-methacryloylaminoethyl (E)-3-[3,4-difluoro-phenyl] acrylate);
poly(3-methacryloylaminopropyl (E)-3-[3,4-difluoro-phenyl]acrylate);
poly(2-methacryloylaminoethyl (E)-3-[3,5-difluoro-phenyl] acrylate);
poly(3-methacryloylaminopropyl (E)-3-[3,5-difluoro-phenyl]acrylate);
poly(2-methacryloylaminoethyl (E)-3-[3-bromo-4-fluoro-phenyl]acrylate);
poly(2-methacryloylaminoethyl (E)-3-[4-chloro-3-nitro-phenyl]acrylate);
poly(3-methacryloylaminopropyl (E)-3-[4-chloro-3-nitro-phenyl]acrylate);
poly(2-methacryloylaminoethyl (E)-3-[2-chloro-4-fluoro-phenyl]acrylate);
poly(3-methacryloylaminopropyl (E)-3-[2-chloro-4-fluoro-phenyl]acrylate);
poly(2-methacryloylaminoethyl (E)-3-[3-chloro-4-fluoro-phenyl]acrylate);
poly(3-methacryloylaminopropyl (E)-3-[3-chloro-4-fluoro-phenyl]acrylate);
poly(2-methacryloylaminoethyl (E)-3-[3-fluoro-2-methyl-phenyl]acrylate);
poly(3-methacryloylaminopropyl (E)-3-[3-fluoro-2-methyl-phenyl]acrylate);

poly(2-methacryloylaminoethyl (E)-3-[4-methoxy-4'-biphenyl]acrylate);
poly(3-methacryloylaminopropyl (E)-3-[4-methoxy-4'-biphenyl]acrylate);
poly(2-methacryloylaminoethyl (E)-3-[4-cyano-4'-biphenyl]acrylate);
poly(3-methacryloylaminopropyl (E)-3-[4-cyano-4'-biphenyl]acrylate);
poly(2-methacryloylaminoethyl (E)-3-[4-(trans-4-methyl-cyclohexyl)phenyl]acrylate);
poly(3-methacryloylaminopropyl (E)-3-[4-(trans-4-methyl-cyclohexyl)phenyl]acrylate);
poly(3-methacryloylaminopropyl (E)-3-[4-(trans-4-ethyl-cyclohexyl)phenyl]acrylate);
poly(2-acryloylaminoethyl (E)-3-[4-cyano-phenyl] acrylamide);
poly(3-acryloylaminopropyl (E)-3-[3-cyano-phenyl] acrylamide);
poly(4-acryloylaminobutyl (E)-3-phenylacrylamide);
poly(3-acryloylaminopropyl (E)-3-[4-methoxy-phenyl] acrylamide);
poly(2-acryloylaminoethyl (E)-3-[4-ethoxy-phenyl] acrylamide);
poly(2-acryloylaminoethyl (E)-3-[4-methyl-phenyl] acrylamide);
poly(4-acryloylaminobutyl (E)-3-[4-ethyl-phenyl] acrylamide);
poly(2-acryloylaminoethyl (E)-3-[4-trifluoromethyl-phenyl]acrylamide);
poly(3-acryloylaminopropyl (E)-3-[4-trifluoromethoxy-phenyl]acrylamide);
poly(2-acryloylaminoethyl (E)-3-[3-nitro-phenyl] acrylamide);
poly(2-acryloylaminoethyl (E)-3-[4-nitro-phenyl] acrylamide);
poly(3-acryloylaminopropyl (E)-3-[3-chloro-phenyl] acrylamide);
poly(2-acryloylaminoethyl (E)-3-[4-chloro-phenyl] acrylamide);
poly(2-acryloylaminoethyl (E)-3-[3-fluoro-phenyl] acrylamide);
poly(3-acryloylaminopropyl (E)-3-[4-fluoro-phenyl] acrylamide);
poly(4-acryloylaminobutyl (E)-3-[2,4-di-methyl-phenyl] acrylamide);
poly(3-acryloylaminopropyl (E)-3-[2,3-dimethoxy-phenyl] acrylamide);
poly(2-acryloylaminoethyl (E)-3-[2,4-dimethoxy-phenyl] acrylamide);
poly(2-acryloylaminoethyl (E)-3-[3,4-dimethoxy-phenyl] acrylamide);
poly(3-acryloylaminopropyl (E)-3-[3,5-dimethoxy-phenyl] acrylamide);
poly(2-acryloylaminoethyl (E)-3-[3,4-dicyano-phenyl] acrylamide);
poly(3-acryloylaminopropyl (E)-3-[3,5-dicyano-phenyl] acrylamide);
poly(5-acryloylaminopentyl (E)-3-[2,4-dinitro-phenyl] acrylamide);
poly(6-acryloylaminohexyl (E)-3-[3,4-dichloro-phenyl] acrylamide);
poly(2-acryloylaminoethyl (E)-3-[3,5-dichloro-phenyl] acrylamide);
poly(2-acryloylaminoethyl (E)-3-[3,4-difluoro-phenyl] acrylamide);
poly(3-acryloylaminopropyl (E)-3-[3,5-difluoro-phenyl] acrylamide);
poly(2-acryloylaminoethyl (E)-3-[3-bromo-4-fluoro-phenyl]acrylamide);
poly(2-acryloylaminoethyl (E)-3-[5-bromo-2-methoxy-phenyl]acrylamide);
poly(2-acryloylaminoethyl (E)-3-[2-chloro-5-nitro-phenyl] acrylamide);
poly(3-acryloylaminopropyl (E)-3-[4-chloro-3-nitro-phenyl]acrylamide);
poly(2-acryloylaminoethyl (E)-3-[2-chloro-4-fluoro-phenyl]acrylamide);
poly(6-acryloylaminohexyl (E)-3-[3-chloro-4-fluoro-phenyl]acrylamide);
poly(3-acryloylaminopropyl (E)-3-[3-fluoro-2-methyl-phenyl]acrylamide);
poly(3-acryloylaminopropyl (E)-3-biphenyl-acrylamide);
poly(2-acryloylaminoethyl (E)-3-[4-methoxy-4'-biphenyl] acrylamide);
poly(2-acryloylaminoethyl (E)-3-[4-cyano-4'-biphenyl] acrylamide);
poly(3-acryloylaminopropyl (E)-3-[4-(trans-4-methyl-cyclohexyl)phenyl]acrylamide);
poly(2-acryloylaminoethyl (E)-3-[4-(trans-4-ethylocyclohexyl)-phenyl]acrylamide);
poly(2-acryloyloxyethyl (E)-3-[4-cyano-phenyl] acrylamide);
poly(4-acryloyloxybutyl (E)-3-[3-cyano-phenyl] acrylamide);
poly(3-acryloyloxypropyl (E)-3-phenylacrylamide);
poly(2-acryloyloxyethyl (E)-3-[4-methoxy-phenyl] acrylamide);
poly(2-acryloyloxyethyl (E)-3-[4-ethoxy-phenyl] acrylamide);
poly(3-acryloyloxypropyl (E)-3-[4-methyl-phenyl] acrylamide);
poly(3-acryloyloxypropyl (E)-3-[4-ethyl-phenyl] acrylamide);
poly(2-acryloyloxyethyl (E)-3-[4-trifluoromethyl-phenyl] acrylamide);
poly(2-acryloyloxyethyl (E)-3-[4-trifluoromethoxy-phenyl] acrylamide);
poly(6-acryloyloxyhexyl (E)-3-[3-nitro-phenyl] acrylamide);
poly(2-acryloyloxyethyl (E)-3-[4-nitro-phenyl]acrylamide);
poly(5-acryloyloxypentyl (E)-3-[3-chloro-phenyl] acrylamide);
poly(2-acryloyloxyethyl (E)-3-[4-chloro-phenyl] acrylamide);
poly(2-acryloyloxyethyl (E)-3-[3-fluoro-phenyl] acrylamide);
poly(3-acryloyloxypropyl (E)-3-[4-fluoro-phenyl] acrylamide);
poly(2-acryloyloxyethyl (E)-3-[2,4-dimethyl-phenyl] acrylamide);
poly(2-acryloyloxyethyl (E)-3-[2,3-dimethoxy-phenyl] acrylamide);
poly(3-acryloyloxypropyl (E)-3-[2,4-dimethoxy-phenyl] acrylamide);
poly(2-acryloyloxyethyl (E)-3-[3,4-dimethoxy-phenyl] acrylamide);
poly(2-acryloyloxyethyl (E)-3-[3,5-dimethoxy-phenyl] acrylamide);
poly(6-acryloyloxyhexyl (E)-3-[3,4-dicyano-phenyl] acrylamide);
poly(2-acryloyloxyethyl (E)-3-[3,5-dicyano-phenyl] acrylamide);
poly(2-acryloyloxyethyl (E)-3-[2,4-dinitro-phenyl] acrylamide);

poly(3-acryloyloxypropyl (E)-3-[3,4-dichloro-phenyl] acrylamide);
poly(3-acryloyloxypropyl (E)-3-[3,5-dichloro-phenyl] acrylamide);
poly(2-acryloyloxyethyl (E)-3-[3,4-difluoro-phenyl] acrylamide);
poly(2-acryloyloxyethyl (E)-3-[3,5-difluoro-phenyl] acrylamide);
poly(2-acryloyloxyethyl (E)-3-[3-bromo-4-fluoro-phenyl] acrylamide);
poly(3-acryloyloxypropyl (E)-3-[4-chloro-3-nitro-phenyl] acrylamide);
poly(4-acryloyloxybutyl (E)-3-[2-chloro-4-fluoro-phenyl] acrylamide);
poly(2-acryloyloxyethyl (E)-3-[3-chloro-4-fluoro-phenyl] acrylamide);
poly(3-acryloyloxypropyl (E)-3-[3-fluoro-2-methyl-phenyl] acrylamide);
poly(3-acryloyloxypropyl (E)-3-biphenyl-acrylamide);
poly(2-acryloyloxyethyl (E)-3-[4-methoxy-4'-biphenyl] acrylamide);
poly(2-acryloyloxyethyl (E)-3-[4-cyano-4'-biphenyl] acrylamide);
poly(3-acryloyloxypropyl (E)-3-[4-(trans-4-methyl-cyclohexyl)-phenyl]acrylamide);
poly(5-acryloyloxypentyl (E)-3-[4-(trans-4-ethyl-cyclohexyl)-phenyl]acrylamide);
poly(2-acryloylaminoethyl (E)-3-[4-cyano-phenyl] acrylate);
poly(3-acryloylaminopropyl (E)-3-[3-cyano-phenyl] acrylate);
poly(2-acryloylaminoethyl (E)-3-[4-methoxy-phenyl] acrylate);
poly(2-acryloylaminoethyl (E)-3-[4-ethoxy-phenyl] acrylate);
poly(2-acryloylaminoethyl (E)-3-[4-methyl-phenyl] acrylate);
poly(3-acryloylaminopropyl (E)-3-[4-ethylophenyl] acrylate);
poly(2-acryloylaminoethyl (E)-3-[4-propyl-phenyl] acrylate);
poly(2-acryloylaminoethyl (E)-3-[4-trifluoromethyl-phenyl]acrylate);
poly(3-acryloylaminopropyl (E)-3-[4-trifluoromethoxy-phenyl]acrylate);
poly(4-acryloylaminobutyl (E)-3-[3-nitro-phenyl]acrylate);
poly(2-acryloylaminoethyl (E)-3-[4-nitro-phenyl]acrylate);
poly(2-acryloylaminoethyl (E)-3-[3-chloro-phenyl] acrylate);
poly(3-acryloylaminopropyl (E)-3-[4-chloro-phenyl] acrylate);
poly(2-acryloylaminoethyl (E)-3-[3-fluoro-phenyl] acrylate);
poly(2-acryloylaminoethyl (E)-3-[4-fluoro-phenyl] acrylate);
poly(3-acryloylaminopropyl (E)-3-[2,4-dimethyl-phenyl] acrylate);
poly(3-acryloylaminopropyl (E)-3-[2,3-dimethoxy-phenyl] acrylate);
poly(2-acryloylaminoethyl (E)-3-[2,4-dimethoxy-phenyl] acrylate);
poly(2-acryloylaminoethyl (E)-3-[3,4-dimethoxy-phenyl] acrylate);
poly(6-acryloylaminohexyl (E)-3-[3,5-dimethoxy-phenyl] acrylate);
poly(2-acryloylaminoethyl (E)-3-[3,4-dicyano-phenyl] acrylate);
poly(2-acryloylaminoethyl (E)-3-[3,5-dicyano-phenyl] acrylate);
poly(3-acryloylaminopropyl (E)-3-[2,4-dinitro-phenyl] acrylate);
poly(3-acryloylaminopropyl (E)-3-[3,4-dichloro-phenyl] acrylate);
poly(2-acryloylaminoethyl (E)-3-[3,5-dichloro-phenyl] acrylate);
poly(2-acryloylaminoethyl (E)-3-[3,4-difluoro-phenyl] acrylate);
poly(5-acryloylaminopentyl (E)-3-[3,5-difluoro-phenyl] acrylate);
poly(2-acryloylaminoethyl (E)-3-[3-bromo-4-fluoro-phenyl]acrylate);
poly(2-acryloylaminoethyl (E)-3-[4-chloro-3-nitro-phenyl] acrylate);
poly(3-acryloylaminopropyl (E)-3-[2-chloro-4-fluoro-phenyl]acrylate);
poly(2-acryloylaminoethyl (E)-3-[3-chloro-4-fluoro-phenyl]acrylate);
poly(2-acryloylaminoethyl (E)-3-[3-fluoro-2-methyl-phenyl]acrylate);
poly(4-acryloylaminobutyl (E)-3-[4-methoxy-4'-biphenyl] acrylate);
poly(2-acryloylaminoethyl (E)-3-[4-cyano-4'-biphenyl] acrylate);
poly(3-acryloylaminopropyl (E)-3-[4-(trans-4-methyl-cyclohexyl)phenyl]acrylate);
poly(2-acryloylaminoethyl (E)-3-[4-(trans-4-ethyl-cyclohexyl)-phenyl]acrylate).

EXAMPLE 6

1.63 g of 2-methyl-acrylic acid (E)-1-[3-(4-methoxy-phenyl)acryloyl]-piperidin-4-yl ester and 0.0081 g of azo-bisisobutyronitrile were dissolved in 10 ml of tetrahydrofuran. The solution was flushed for 10 minutes with a weak argon stream. Subsequently, the reaction vessel was closed air-tight. The mixture was heated to 60° C.; for 19 hours. Thereafter, the reaction vessel was opened and the solution was added dropwise while stirring to 300 ml of diethyl ether at room temperature. The separated polymer was filtered off, dried, dissolved in 10 ml of tetrahydrofuran and this solution was again added dropwise to 300 ml of diethyl ether. This procedure was repeated twice. Filtration and drying at 50° C. in a vacuum gave 1.33 g of poly[1-[1-[(E)-3-(4-methoxy-phenyl)-acryloyl]-piperidin-4-yloxycarbonyl]-1-methyl-ethylene]. The polymer has a glass stage at $T_g$=143° C. ($\Delta c_p$=0.30 J/gK).

The 2-methyl-acrylic acid (E)-1-[3-(4-methoxy-phenyl) acryloyl]-piperidin-4-yl ester used as the starting material was prepared as follows:

a) Firstly 2.1 g of cyanuric chloride and subsequently 3.2 ml of triethylamine were slowly added at room temperature to a solution of 4.06 g of p-methoxycinnamic acid in 100 ml of dry acetone. After three hours the separated byproduct was filtered off and the filtrate was concentrated to dryness. The p-methoxycinnamoyl chloride which remained as the residue was taken up in 50 ml of dry methylene chloride and processed immediately.

3.5 ml of trimethylsilyl chloride were added dropwise in an argon atmosphere to a solution, cooled to 0° C., of 2.8 g of 4-hydroxypiperidine in 100 ml of dry methylene chloride. After stirring at 0° C. for two hours the solution was treated with 2 ml of triethylamine. The previously prepared p-methoxycinnamoyl chloride in 50 ml of methylene chloride was added dropwise to this mixture while cooling with ice. The reaction mixture was stirred overnight and then warmed slowly to room temperature. Subsequently, it was filtered over a thin layer of silica gel. After the methylene chloride had been removed completely in a vacuum the residue remaining was taken up in 50 ml of methanol and, after the addition of 2.7 g of citric acid, stirred at room temperature for three hours. For purification, the mixture was evaporated to dryness in a vacuum, the crude product was taken up in 100 ml of methylene chloride and washed with the same amount of semi-saturated sodium hydrogen carbonate solution. The aqueous phase was extracted twice with 50 ml of methylene chloride each time. Subsequently, the organic phases were combined, dried over magnesium sulphate, treated with 2 g of silica gel and filtered. After removing the solvent 6.65g of 4-hydroxy-(E)-1-[3-(4-methoxyphenyl)-acryloyl]-piperidine remained as a yellow oil.

b) A solution of 6.65 g of 4-hydroxy-(E)-1-[3-(4-methoxy-phenyl)acryloyl]-piperidine in 50 ml of methylene chloride was treated with 4 ml of triethylamine at 0° C. while gassing with argon. 2.7 ml of methacryloyl chloride were added dropwise within 15 minutes. Subsequently, the reaction mixture was concentrated to dryness in a vacuum. Chromatographic purification of the residue on silica gel with ether/hexane (vol. 4:1) gave 4.21 g of 2-methyl-acrylic acid (E)-I-[3-(4-methoxy-phenyl)-acryloyl]-piperidin-4-yl ester as a colourless oil. $\lambda_{max}$ (methylene chloride)=292.5 nm ($\epsilon$=22775 l $mol^{-1}$ $cm^{-1}$).

Having regard to Example 1b), the following compounds can be prepared in an analogous manner:

Poly[1-[1-[(E)-3-phenyl-acryloyl]-piperidin-4-yloxycarbonyl]-1-methylethylene];
poly[1-[1-[(E)-3-(4-methyl-phenyl)-acryloyl]-piperidin-4-yloxycarbonyl]-1-methyl-ethylene];
poly[1-[1-[(E)-3-(4-ethyl-phenyl)-acryloyl]-piperidin-4-yloxycarbonyl]-1-methyl-ethylene];
poly[1-[1-[(E)-3-(4-ethoxy-phenyl)-acryloyl]-piperidin-4-yloxycarbonyl]-1-methyl-ethylene];
poly[1-[1-[(E)-3-(4-trifluoromethyl-phenyl)-acryloyl]-piperidin-4-yloxycarbonyl]-1-methyl-ethylene];
poly[1-[1-[(E)-3-(4-trifluoromethoxy-phenyl)-acryloyl]-piperidin-4yloxycarbonyl]-1-methyl-ethylene];
poly[1-[1-[(E)-3-(3-cyano-phenyl)-acryloyl]-piperidin-4-yloxycarbonyl]-1-methyl-ethylene];
poly[1-[1-[(E)-3-(4-cyano-phenyl)-acryloyl]-piperidin-4-yloxycarbonyl]-1-methyl-ethylene];
poly[1-[1-[(E)-3-(3-nitro-phenyl)-acryloyl]-piperidin-4-yloxycarbonyl]-1-methyl-ethylene];
poly[1-[1-[(E)-3-(4-nitro-phenyl)-acryloyl]-piperidin-4-yloxycarbonyl]-1-methyl-ethylene];
poly[1-[1-[(E)-3-(3-chloro-phenyl)-acryloyl]-piperidin-4-yloxycarbonyl]-1-methyl-ethylene];
poly[1-[1-[(E)-3-(4-chloro-phenyl)-acryloyl]-piperidin-4-yloxycarbonyl]-1-methyl-ethylene];
poly[1-[1-[(E)-3-(3-fluoro-phenyl)-acryloyl]-piperidin-4-yloxycarbonyl]-1-methyl-ethylene];
poly[1-[1-[(E)-3-(4-fluoro-phenyl)-acryloyl]-piperidin-4-yloxycarbonyl]-1-methyl-ethylene];
poly[1-[1-[(E)-3-(2,4-dimethyl-phenyl)-acryloyl]-piperidin-4-yloxycarbonyl]-1-methyl-ethylene];
poly[1-[1-[(E)-3-(2,3-dimethoxy-phenyl)-acryloyl]-piperidin-4-yloxycarbonyl]-1-methyl-ethylene];
poly[1-[1-[(E)-3-(2,4-dimethoxy-phenyl)-acryloyl]-piperidin-4-yloxycarbonyl]-1-methyl-ethylene];
poly[1-[1-[(E)-3-(3,4-dimethoxy-phenyl)-acryloyl]-piperidin-4-yloxycarbonyl]-1-methyl-ethylene];
poly[1-[1-[(E)-3-(3,5-dimethoxy-phenyl)-acryloyl]-piperidin-4-yloxycarbonyl]-1-methyl-ethylene];
poly[1-[1-[(E)-3-(3,4-dicyano-phenyl)-acryloyl]-piperidin-4-yloxycarbonyl]-1-methyl-ethylene];
poly[1-[1-[(E)-3-(3,5-dicyano-phenyl)-acryloyl]-piperidin-4-yloxycarbonyl]-1-methyl-ethylene];
poly[1-[1-[(E)-3-(2,4-dinitro-phenyl)-acryloyl]-piperidin-4-yloxycarbonyl]-1-methyl-ethylene];
poly[1-[1-[(E)-3-(3,4-dichloro-phenyl)-acryloyl]-piperidin-4-yloxycarbonyl]-1-methyl-ethylene];
poly[1-[1-[(E)-3-(3,5-dichloro-phenyl)-acryloyl]-piperidin-4-yloxycarbonyl]-1-methyl-ethylene];
poly[1-[1-[(E)-3-(3,4-difluoro-phenyl)-acryloyl]-piperidin-4-yloxycarbonyl]-1-methyl-ethylene];
poly[1-[1-[(E)-3-(3,5-difluoro-phenyl)-acryloyl]-piperidin-4-yloxycarbonyl]-1-methyl-ethylene];
poly[1-[1-[(E)-3-(3-bromo-4-fluoro-phenyl)-acryloyl]-piperidin-4-yloxycarbonyl]-1-methyl-ethylene];
poly[1-[1-[(E)-3-(4-chloro-3-nitro-phenyl)-acryloyl]-piperidin-4-yloxycarbonyl]-1-methyl-ethylene];
poly[1-[1-[(E)-3-(2-chloro-4-fluoro-phenyl)-acryloyl]-piperidin-4-yloxycarbonyl]-1-methyl-ethylene];
poly[1-[1-[(E)-3-(3-chloro-4-fluoro-phenyl)-acryloyl]-piperidin-4-yloxycarbonyl]-1-methyl-ethylene];
poly[1-[1-[(E)-3-(3-fluoro-2-methyl-phenyl)-acryloyl]-piperidin-4-yloxycarbonyl]-1-methyl-ethylene];
poly[1-[1-[(E)-3-(4-cyano-4'-biphenyl)-acryloyl]-piperidin-4-yloxycarbonyl]-1-methyl-ethylene];
poly[1-[1-[(E)-3-[4-(trans-4-methyl-cyclohexyl)-phenyl]-acryloyl]-piperidin-4-yloxycarbonyl]-1-methyl-ethylene];
poly[1-[1-carbonyl-4-[(E)-3-(4-methyl-phenyl)-acryloyloxy]-piperidine]-1-methyl-ethylene];
poly[1-[1-carbonyl-4-[(E)-3-(4-methoxy-phenyl)-acryloyloxylpiperidine]-1-methyl-ethylene];
poly[1-[1-carbonyl-4-[(E)-3-(4-trifluoromethyl-phenyl)-acryloyloxy]piperidine]-1-methyl-ethylene];
poly[1-[1-carbonyl-4-[(E)-3-(4-trifluoromethoxy-phenyl)-acryloyloxy]piperidine]-1-methyl-ethylene];
poly[1-[1-carbonyl-4-[(E)-3-(3-cyano-phenyl)-acryloyloxy]-piperidine]-1-methyl-ethylene];
poly[1-[1-carbonyl-4-[(E)-3-(4-cyano-phenyl)-acryloyloxyl-piperidine]-1-methyl-ethylene];
poly[1-[1-carbonyl-4-[(E)-3-(3-nitro-phenyl)-acryloyloxy]-piperidine]-1-methyl-ethylene];
poly[1-[1-carbonyl-4-[(E)-3-(4-nitro-phenyl)-acryloyloxy]-piperidine]-1-methyl-ethylene];
poly[1-[1-carbonyl-4-[(E)-3-(3-chloro-phenyl)-acryloyloxy]-piperidine]-1-methyl-ethylene];
poly[1-[1-carbonyl-4-[(E)-3-(4-chloro-phenyl)-acryloyloxy]-piperidine]-1-methyl-ethylene];
poly[1-[1-carbonyl-4-[(E)-3-(3-fluoro-phenyl)-acryloyloxy]-piperidine]-1-methyl-ethylene];
poly[1-[1-carbonyl-4-[(E)-3-(4-fluoro-phenyl)-acryloyloxy]-piperidine]-1-methyl-ethylene];
poly[1-[1-carbonyl-4-[(E)-3-(2,4-dimethyl-phenyl)-acryloyloxy]-piperidine]-1-methyl-ethylene];
poly[1-[1-carbonyl-4-[(E)-3-(2,3-dimethoxy-phenyl)-acryloyloxy]-piperidine]-1-methyl-ethylene];
poly[1-[1-carbonyl-4-[(E)-3-(2,4-dimethoxy-phenyl)-acryloyloxy]-piperidine]-1-methyl-ethylene];
poly[1-[1-carbonyl-4-[(E)-3-(3,4-dimethoxy-phenyl)-acryloyloxy]-piperidine]-1-methyl-ethylene];
poly[1-[1-carbonyl-4-[(E)-3-(3,5-dimethoxy-phenyl)-acryloyloxy]-piperidine]-1-methyl-ethylene];
poly[1-[1-carbonyl-4-[(E)-3-(3,4-dicyano-phenyl)-acryloyloxy]-piperidine]-1-methyl-ethylene];

poly[1-[1-carbonyl-4-[(E)-3-(3,5-dicyano-phenyl)-acryloyloxy]-piperidine]-1-methyl-ethylene];
poly[1-[1-carbonyl-4-[(E)-3-(2,4-dinitro-phenyl)-acryloyloxy]-piperidine]-1-methyl-ethylene];
poly[1-[1-carbonyl-4-[(E)-3-(3,4-dichloro-phenyl)-acryloyloxy]-piperidine]-1-methyl-ethylene];
poly[1-[1-carbonyl-4-[(E)-3-(3,5-dichloro-phenyl)-acryloyloxy]-piperidine]-1-methyl-ethylene];
poly[1-[1-carbonyl-4-[(E)-3-(3,4-difluoro-phenyl)-acryloyloxy]-piperidine]-1-methyl-ethylene];
poly[1-[1-carbonyl-4-[(E)-3-(3,5-difluoro-phenyl)-acryloyloxy]-piperidine]-1-methyl-ethylene];
poly[1-[1-carbonyl-4-[(E)-3-(3-bromo-4-fluoro-phenyl)-acryloyloxy]-piperidine]-1-methyl-ethylene];
poly[1-[1-carbonyl-4-[(E)-3-(4-chloro-3-nitro-phenyl)-acryloyloxy]-piperidine]-1-methyl-ethylene];
poly[1-[1-carbonyl-4-[(E)-3-(2-chloro-4-fluoro-phenyl)-acryloyloxy]-piperidine]-1-methyl-ethylene];
poly[1-[1-carbonyl-4-[(E)-3-(3-chloro-4-fluoro-phenyl)-acryloyloxy]-piperidine]-1-methyl-ethylene];
poly[1-[1-carbonyl-4-[(E)-3-(3-fluoro-2-methyl-phenyl)-acryloyloxy]-piperidine]-1-methyl-ethylene];
poly[1-[1-carbonyl-4-[(E)-3-biphenyl-acryloyloxy]-piperidine]-1-methyl-ethylene];
poly[1-[1-carbonyl-4-[(E)-3-(4-cyano-4'-biphenyl)-acryloyloxy]-piperidine]-1-methyl-ethylene];
poly[1-[1-carbonyl-4-[(E)-3-[4-(trans-4-methyl-cyclohexyl)-phenyl]-acryloyloxy]-piperidine]-1-methyl-ethylene];
poly[1-[1-carbonyl-4-[(E)-3-phenyl-acryloyl]-piperazine]-1-methylethylene];
poly[1-[1-carbonyl-4-[(E)-3-(4-methyl-phenyl)-acryloyl]-piperazine]-1-methyl-ethylene];
poly[1-[1-carbonyl-4-[(E)-3-(4-methoxy-phenyl)-acryloyl]-piperazine]-1-methyl-ethylene];
poly[1-[1-carbonyl-4-[(E)-3-(4-trifluoromethyl-phenyl)-acryloyl]-piperazine]-1-methyl-ethylene];
poly[1-[1-carbonyl-4-[(E)-3-(4-trifluoromethoxy-phenyl)-acryloyl]-piperazine]-1-methyl-ethylene];
poly[1-[1-carbonyl-4-[(E)-3-(3-cyano-phenyl)-acryloyl]-piperazine]-1-methyl-ethylene];
poly[1-[1-carbonyl-4-[(E)-3-(4-cyano-phenyl)-acryloyl]-piperazine]-1-methyl-ethylene];
poly[1-[1-carbonyl-4-[(E)-3-(3-nitro-phenyl)-acryloyl]-piperazine]-1-methyl-ethylene];
poly[1-[1-carbonyl-4-[(E)-3-(4-nitro-phenyl)-acryloyl]-piperazine]-1-methyl-ethylene];
poly[1-[1-carbonyl-4-[(E)-3-(3-chloro-phenyl)-acryloyl]-piperazine]-1-methyl-ethylene];
poly[1-[1-carbonyl-4-[(E)-3-(4-chloro-phenyl)-acryloyl]-piperazine]-1-methyl-ethylene];
poly[1-[1-carbonyl-4-[(E)-3-(3-fluoro-phenyl)-acryloyl]-piperazine]-1-methyl-ethylene];
poly[1-[1-carbonyl-4-[(E)-3-(4-fluoro-phenyl)-acryloyl]-piperazine]-1-methyl-ethylene];
poly[1-[1-carbonyl-4-[(E)-3-(2,4-dimethyl-phenyl)-acryloyl]-piperazine]-1-methyl-ethylene];
poly[1-[1-carbonyl-4-[(E)-3-(2,3-dimethoxy-phenyl)-acryloyl]-piperazine]-1-methyl-ethylene];
poly[1-[1-carbonyl-4-[(E)-3-(2,4-dimethoxy-phenyl)-acryloyl]-piperazine]-1-methyl-ethylene];
poly[1-[1-carbonyl-4-[(E)-3-(3,4-dimethoxy-phenyl)-acryloyl]-piperazine]-1-methyl-ethylene];
poly[1-[1-carbonyl-4-[(E)-3-(3,5-dimethoxy-phenyl)-acryloyl]-piperazine]-1-methyl-ethylene];
poly[1-[1-carbonyl-4-[(E)-3-(3 4-dicyano-phenyl)-acryloyl]-piperazine]-1-methyl-ethylene];
poly[1-[1-carbonyl-4-[(E)-3-(3 5-dicyano-phenyl)-acryloyl]-piperazine]-1-methyl-ethylene];
poly[1-[1-carbonyl-4-[(E)-3-(2 4-dinitrophenyl)-acryloyl]-piperazine]-1-methyl-ethylene];
poly[1-[1-carbonyl-4-[(E)-3-(3 4-dichloro-phenyl)-acryloyl]-piperazine]-1-methyl-ethylene];
poly[1-[1-carbonyl-4-[(E)-3-(3 5-dichloro-phenyl)-acryloyl]-piperazine]-1-methyl-ethylene];
poly[1-[1-carbonyl-4-[(E)-3-(3 4-difluoro-phenyl)-acryloyl]-piperazine]-1-methyl-ethylene];
poly[1-[1-carbonyl-4-[(E)-3-(3,5-difluoro-phenyl)-acryloyl]-piperazine]-1-methyl-ethylene];
poly[1-[1-carbonyl-4-[(E)-3-(4-chloro-3-nitro-phenyl)-acryloyl]-piperazine]-1-methyl-ethylene];
poly[1-[1-carbonyl-4-[(E)-3-(2-chloro-4-fluoro-phenyl)-acryloyl]-piperazine]-1-methyl-ethylene];
poly[1-[1-carbonyl-4-[(E)-3-(3-chloro-4-fluoro-phenyl)-acryloyl]-piperazine]-1-methyl-ethylene];
poly[1-[1-carbonyl-4-[(E)-3-(3-fluoro-2-methyl-phenyl)-acryloyl]-piperazine]-1-methyl-ethylene];
poly[1-[1-carbonyl-4-[(E)-3-(4-cyano-4'-biphenyl)-acryloyl]-piperazine]-1-methyl-ethylene];
poly[1-[1-carbonyl-4-[(E)-3-[4-(trans-4-methyl-cyclohexyl)-phenyl]-acryloyl]-piperazine]-1-methyl-ethylene];
poly[1-[1-[(E)-3-(4-methyl-phenyl)-acryloyl]-piperidin-4-yloxycarbonyl]-ethylene];
poly[1-[1-[(E)-3-(4-methoxy-phenyl)-acryloyl]-piperidin-4-yloxycarbonyl]-ethylene];
poly[1-[1-[(E)-3-(4-trifluoromethyl-phenyl)-acryloyl]-piperidin-4-yloxycarbonyl]-ethylene];
poly[1-[1-[(E)-3-(4-trifluoromethoxy-phenyl)-acryloyl]-piperidin-4-yloxycarbonyl]-ethylene];
poly[1-[1-[(E)-3-(3-cyano-phenyl)-acryloyl]-piperidin-4-yloxycarbonyl]-ethylene];
poly[1-[1-[(E)-3-(4-cyano-phenyl)-acryloyl]-piperidin-4-yloxycarbonyl]-ethylene];
poly[1-[1-[(E)-3-(3-nitro-phenyl)-acryloyl]-piperidin-4-yloxycarbonyl]-ethylene];
poly[1-[1-[(E)-3-(4-nitro-phenyl)-acryloyl]-piperidin-4-yloxycarbonyl]-ethylene];
poly[1-[1-[(E)-3-(3-chloro-phenyl)-acryloyl]-piperidin-4-yloxycarbonyl]-ethylene];
poly[1-[1-[(E)-3-(4-chloro-phenyl)-acryloyl]-piperidin-4-yloxycarbonyl]-ethylene];
poly[1-[1-[(E)-3-(3-fluoro-phenyl)-acryloyl]-piperidin-4-yloxycarbonyl]-ethylene];
poly[1-[1-[(E)-3-(4-fluoro-phenyl)-acryloyl]-piperidin-4-yloxycarbonyl]-ethylene];
poly[1-[1-[(E)-3-(2,4-dimethyl-phenyl)-acryloyl]-piperidin-4-yloxycarbonyl]-ethylene];
poly[1-[1-[(E)-3-(2,3-dimethoxy-phenyl)-acryloyl]-piperidin-4-yloxycarbonyl]-ethylene];
poly[1-[1-[(E)-3-(2,4-dimethoxy-phenyl)-acryloyl]-piperidin-4-yloxycarbonyl]-ethylene];
poly[1-[1-[(E)-3-(3,4-dimethoxy-phenyl)-acryloyl]-piperidin-4-yloxycarbonyl]-ethylene];
poly[1-[1-[(E)-3-(3,5-dimethoxy-phenyl)-acryloyl]-piperidin-4-yloxycarbonyl]-ethylene];
poly[1-[1-[(E)-3-(3,4-dicyano-phenyl)-acryloyl]-piperidin-4-yloxycarbonyl]-ethylene];
poly[1-[1-[(E)-3-(3,5-dicyano-phenyl)-acryloyl]-piperidin-4-yloxycarbonyl]-ethylene];
poly[1-[1-[(E)-3-(2,4-dinitro-phenyl)-acryloyl]-piperidin-4-yloxycarbonyl]-ethylene];
poly[1-[1-[(E)-3-(3,4-dichloro-phenyl)-acryloyl]-piperidin-4-yloxycarbonyl]-ethylene];

poly[1-[1-[(E)-3-(3,5-dichloro-phenyl)-acryloyl]-piperidin-4-yloxycarbonyl]-ethylene];
poly[1-[1-[(E)-3-(3,4-difluoro-phenyl)-acryloyl]-piperidin-4-yloxycarbonyl]-ethylene];
poly[1-[1-[(E)-3-(3,5-difluoro-phenyl)-acryloyl]-piperidin-4-yloxycarbonyl]-ethylene];
poly[1-[1-[(E)-3-(3-bromo-4-fluoro-phenyl)-acryloyl]-piperidin-4-yloxycarbonyl]-ethylene];
poly[1-[1-[(E)-3-(4-chloro-3-nitro-phenyl)-acryloyl]-piperidin-4-yloxycarbonyl]-ethylene];
poly[1-[1-[(E)-3-(2-chloro-4-fluoro-phenyl)-acryloyl]-piperidin-4-yloxycarbonyl]-ethylene];
poly[1-[1-[(E)-3-(3-chloro-4-fluoro-phenyl)-acryloyl]-piperidin-4-yloxycarbonyl]-ethylene];
poly[1-[1-[(E)-3-(3-fluoro-2-methyl-phenyl)-acryloyl]-piperidin-4-yloxycarbonyl]-ethylene];
poly[1-[1-[(E)-3-(4-cyano-4'-biphenyl)-acryloyl]-piperidin-4-yloxycarbonyl]-ethylene];
poly[1-[1-[(E)-3-[4-(trans-4-methyl-cyclohexyl)-phenyl]-acryloyl]-piperidin-4-yloxycarbonyl]-ethylene];
poly[1-[1-carbonyl-4-[(E)-3-(4-methyl-phenyl)-acryloyloxy]-piperidine]-ethylene];
poly[1-[1-carbonyl-4-[(E)-3-(4-methoxy-phenyl)-acryloyloxy]-piperidine]-ethylene];
poly[1-[1-carbonyl-4-[(E)-3-(4-trifluoromethyl-phenyl)-acryloyloxy]-piperidine]-ethylene];
poly[1-[1-carbonyl-4-[(E)-3-(4-trifluoromethoxy-phenyl)-acryloyloxy]-piperidine]-ethylene];
poly[1-[1-carbonyl-4-[(E)-3-(3-cyano-phenyl)-acryloyloxy]-piperidine]-ethylene];
poly[1-[1-carbonyl-4-[(E)-3-(4-cyano-phenyl)-acryloyloxy]-piperidine]-ethylene];
poly[1-[1-carbonyl-4-[(E)-3-(3-nitro-phenyl)-acryloyloxy]-piperidine]-ethylene];
poly[1-[1-carbonyl-4-[(E)-3-(4-nitro-phenyl)-acryloyloxy]-piperidine]-ethylene];
poly[1-[1-carbonyl-4-[(E)-3-(3-chloro-phenyl)-acryloyloxy]-piperidine]-ethylene];
poly[1-[1-carbonyl-4-[(E)-3-(4-chloro-phenyl)-acryloyloxy]-piperidine]-ethylene];
poly[1-[1-carbonyl-4-[(E)-3-(3-fluoro-phenyl)-acryloyloxy]-piperidine]-ethylene];
poly[1-[1-carbonyl-4-[(E)-3-(4-fluoro-phenyl)-acryloyloxy]-piperidine]-ethylene];
poly[1-[1-carbonyl-4-[(E)-3-(2,4-dimethyl-phenyl)-acryloyloxy]-piperidine]-ethylene];
poly[1-[1-carbonyl-4-[(E)-3-(2 3-dimethoxy-phenyl)-acryloyloxy]-piperidine]-ethylene];
poly[1-[1-carbonyl-4-[(E)-3-(2 4-dimethoxy-phenyl)-acryloyloxy]-piperidine]-ethylene];
poly[1-[1-carbonyl-4-[(E)-3-(3 4-dimethoxy-phenyl)-acryloyloxy]-piperidine]-ethylene];
poly[1-[1-carbonyl-4-[(E)-3-(3 5-dimethoxy-phenyl)-acryloyloxy]-piperidine]-ethylene];
poly[1-[1-carbonyl-4-[(E)-3-(3 4-dicyano-phenyl)-acryloyloxy]-piperidine]-ethylene];
poly[1-[1-carbonyl-4-[(E)-3-(3 5-dicyano-phenyl)-acryloyloxy]-piperidine]-ethylene];
poly[1-[1-carbonyl-4-[(E)-3-(2 4-dinitro-phenyl)-acryloyloxy]-piperidine]-ethylene];
poly[1-[1-carbonyl-4-[(E)-3-(3 4-dichloro-phenyl)-acryloyloxy]-piperidine]-ethylene];
poly[1-[1-carbonyl-4-[(E)-3-(3 5-dichloro-phenyl)-acryloyloxy]-piperidine]-ethylene];
poly[1-[1-carbonyl-4-[(E)-3-(3,4-difluoro-phenyl)-acryloyloxy]-piperidine]-ethylene];
poly[1-[1-carbonyl-4-[(E)-3-(3,5-difluoro-phenyl)-acryloyloxy]-piperidine]-ethylene];
poly[1-[1-carbonyl-4-[(E)-3-(3-bromo-4-fluoro-phenyl)-acryloyloxy]-piperidine]-ethylene];
poly[1-[1-carbonyl-4-[(E)-3-(4-chloro-3-nitro-phenyl)-acryloyloxy]-piperidine]-ethylene];
poly[1-[1-carbonyl-4-[(E)-3-(2-chloro-4-fluoro-phenyl)-acryloyloxy]-piperidine]-ethylene];
poly[1-[1-carbonyl-4-[(E)-3-(3-chloro-4-fluoro-phenyl)-acryloyloxy]-piperidine]-ethylene];
poly[1-[1-carbonyl-4-[(E)-3-(4-cyano-4'-biphenyl)-acryloyloxy]-piperidine]-ethyene];
poly[1-[1-carbonyl-4-[(E)-3-[4-(trans-4-methyl-cyclohexyl)-phenyl]-acryloyloxy]-piperidine]ethylene];
poly[1-[1-carbonyl-4-[(E)-3-phenyl-acryloyl]-piperazine]-ethylene];
poly[1-[1-carbonyl-4-[(E)-3-(4-methyl-phenyl)-acryloyl]-piperazine]-ethylene];
poly[1-[1-carbonyl-4-[(E)-3-(4-methoxy-phenyl)-acryloyl]-piperazine]-ethylene];
poly[1-[1-carbonyl-4-[(E)-3-(4-trifluoromethyl-phenyl)-acryloyl]-piperazine]-ethylene];
poly[1-[1-carbonyl-4-[(E)-3-(4-trifluoromethoxy-phenyl)-acryloyl]-piperazine]-ethylene];
poly[1-[1-carbonyl-4-[(E)-3-(3-cyano-phenyl)-acryloyl]-piperazine]-ethylene];
poly[1-[1-carbonyl-4-[(E)-3-(4-cyano-phenyl)-acryloyl]-piperazine]-ethylene];
poly[1-[1-carbonyl-4-[(E)-3-(3-nitro-phenyl)-acryloyl]-piperazine]-ethylene];
poly[1-[1-carbonyl-4-[(E)-3-(4-nitro-phenyl)-acryloyl]-piperazine]-ethylene];
poly[1-[1-carbonyl-4-[(E)-3-(3-chloro-phenyl)-acryloyl]-piperazine]-ethylene];
poly[1-[1-carbonyl-4-[(E)-3-(4-chloro-phenyl)-acryloyl]-piperazine]-ethylene];
poly[1-[1-carbonyl-4-[(E)-3-(2-fluoro-phenyl)-acryloyl]-piperazine]-ethylene];
poly[1-[1-carbonyl-4-[(E)-3-(3-fluoro-phenyl)-acryloyl]-piperazine]-ethylene];
poly[1-[1-carbonyl-4-[(E)-3-(4-fluoro-phenyl)-acryloyl]-piperazine]-ethylene];
poly[1-[1-carbonyl-4-[(E)-3-(2,4-dimethyl-phenyl)-acryloyl]-piperazine]-ethylene];
poly[1-[1-carbonyl-4-[(E)-3-(2,3-dimethoxy-phenyl)-acryloyl]-piperazine]-ethylene];
poly[1-[1-carbonyl-4-[(E)-3-(2,4-dimethoxy-phenyl)-acryloyl]-piperazine]-ethylene];
poly[1-[1-carbonyl-4-[(E)-3-(3,4-dimethoxy-phenyl)-acryloyl]-piperazine]-ethylene];
poly[1-[1-carbonyl-4-[(E)-3-(3,5-dimethoxy-phenyl)-acryloyl]-piperazine]-ethylene];
poly[1-[1-carbonyl-4-[(E)-3-(3,4-dicyano-phenyl)-acryloyl]-piperazine]-ethylene];
poly[1-[1-carbonyl-4-[(E)-3-(3,5-dicyano-phenyl)-acryloyl]-piperazine]-ethylene];
poly[1-[1-carbonyl-4-[(E)-3-(2,4-dinitro-phenyl)-acryloyl]-piperazine]-ethylene];
poly[1-[1-carbonyl-4-[(E)-3-(3,4-dichloro-phenyl)-acryloyl]-piperazine]-ethylene];
poly[1-[1-carbonyl-4-[(E)-3-(3,5-dichloro-phenyl)-acryloyl]-piperazine]-ethylene];
poly[1-[1-carbonyl-4-[(E)-3-(3,4-difluoro-phenyl)-acryloyl]-piperazine]-ethylene];
poly[1-[1-carbonyl-4-[(E)-3-(3,5-difluoro-phenyl)-acryloyl]-piperazine]-ethylene];
poly[1-[1-carbonyl-4-[(E)-3-(3-bromo-4-fluoro-phenyl)-acryloyl]-piperazine]-ethylene];
poly[1-[1-carbonyl-4-[(E)-3-(4-chloro-3-nitro-phenyl)-acryloyl]-piperazine]-ethylene];

poly[1-[1-carbonyl-4-[(E)-3-(2-chloro-4-fluoro-phenyl)-acryloyl]-piperazine]-ethylene];

poly[1-[1-carbonyl-4-[(E)-3-(3-chloro-4-fluoro-phenyl)-acryloyl]-piperazine]-ethylene];

poly[1-[1-carbonyl-4-[(E)-3-(4-cyano-4'-biphenyl)-acryloyl]-piperazine]-ethylene];

poly[1-[1-carbonyl-4-[(E)-3-[4-(trans-4-methyl-cyclohexyl)-phenyl]-acryloyl]-piperazine]-ethylene].

We claim:

1. A polymer of formula I

I

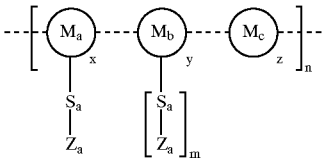

wherein $M_a$, $M_b$, $M_c$ are monomer units for homo- or copolymers;

x, y, z are mole fractions of the copolymers, whereby in each case $0<X\leqq 1$; $0\leqq y\leqq 1$ and $0\leqq z<1$;

$S_a$, $S_b$ are independently of one another, methylene, 1,2-ethylene, 1,3-propylene, 1,4-butylene, 1,5-pentylene, 1,6-hexylene, 1,2-propylene, 1,3-butylene, cyclopentane-1,2-diyl, cyclopentane-1,3-diyl, cyclohexane-1,3-diyl, cyclohexane-1,4-diyl, piperidine-1,4-diyl, piperizine-1,4-diyl, 1,2-phenylene, 1,3-phenylene, 1,4-phenylene, ethyleneoxy, ethyleneoxycarbonyl, ethylenecarboxy, CONH— or —CONR' in which $R^1$ is lower alkyl;

$Z_a$, $Z_b$ each independently are formula II

II

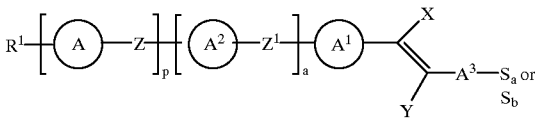

wherein ring $A^1$ is 1,4-phenylene, which is unsubstituted or substituted with at least one of halogen, cyano and nitro, or pyridine-2,5-yl, pyrimidine-2-5-yl, 2,5-thiophenediyl, 2,5-furanylene, 1,4- or 2,6-naphthylene, in which a CH group can be replaced by nitrogen;

ring A,$A^2$ each individually are 1,4-phenylene, which is unsubstituted or substituted with at least one of halogen, cyano, and nitro, pyridine-2-5-yl, pyrimidine-2,5-yl, or 2,5-thiophenediyl, 2,5-furanylene, trans-1,4-cyclohexylene, trans-1,3-dioxane-2,5-yl or 1,4-piperidyl;

$A^3$ is —COO—, —CONH—, —CO—E—, 1,4-phenylene, which is unsubstituted or substituted with at least one of halogen, cyano and nitro, or pyridine-2,5-yl, pyrimidine-2-5-yl, 2,5-thiophenediyl, 2,5-furanylene, 1,4- or 2,6-naphthylene, in which a CH group can be replaced by nitrogen;

E is 1,4-phenylene, which is unsubstituted or substituted with at least one of halogen, cyano and nitro, or pyridine-2,5-yl, pyrimidine-2,5-yl, 2,5-thiophenediyl, 2,5-furanylene, 1,4- or 2,6-naphthylene, in which a CH group can be replaced by nitrogen;

Z,$Z^1$ each independently are a single covalent bond, —$CH_2CH_2$—, COO—, —OOC—, —$OCH_2$—, $CH_2O$—, —C≡C—, —$(CH_2)_4$, —$O(CH_2)_3$—, —$(CH_2)_3O$— or the trans form of —$OCH_2CH$=CH—, —CH=$CHCH_2O$—, —$(CH_2)_2$ CH=CH— or —CH=$CH(CH_2)_2$—;

$R^1$ is hydrogen, halogen, cyano, nitro, NCS, alkyl with 1 to 12 carbon atoms, which is unsubstituted or substituted with fluorine and in which 1 or 2 non-adjacent —$CH_2$— groups can be replaced by oxygen, —COO—, —OOC—, —CO— and in which a —$CH_2CH_2$— group can be replaced by —CH=CH—;

n,p each independently are 0 or 1;

X,Y each independently are hydrogen, halogen, cyano, alkyl with 1 to 12 carbon atoms which is unsubstituted or substituted with fluorine and in which 1 or 2 non-adjacent —$CH_2$— groups can be replaced by oxygen, —COO—, —OOC—, —CO— and/or —CH=CH—;

with the proviso that $A^3$ is different from —COO—, when simultaneously n and p each are 0, $A^1$ is phenyl, $R^1$ is hydrogen or methoxy and $S_a$ and, respectively $S_b$ are a single bond;

n' is from 4–100 000 and m is 0 or 1.

2. A polymer according to claim 1 of formula 1-A:

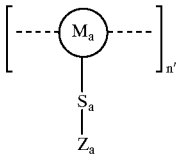

wherein Ma, Sa, Za and n' have the significance given in claim 1.

3. A polymer according to of claim 1, wherein the isomerization/dimerization units $Z_a$ and $Z_b$ each independently are of formula

II-A

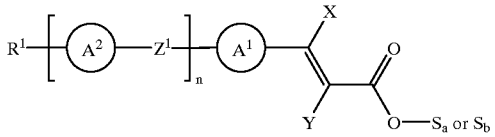

II-B

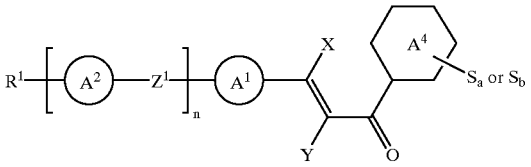

II-C

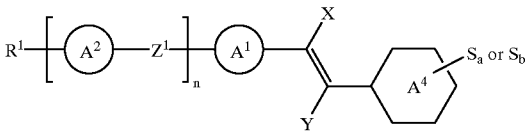

wherein ring $A^1$ is 1,4-phenylene, which is unsubstituted or substituted with halogen, cyano and/or nitro, or pyrimidine-2,5-diyl, pyridine-2,5-diyl, 2,5-thiophenediyl, 2,5-furanylene, 1,4-naphthylene or 2,6-naphthylene;

ring $A^2$ is 1,4-phenylene, which is unsubstituted or substituted with halogen, cyano and/or nitro, or pyrimidine-2,5-diyl, pyridine-2,5-diyl, 2,5-thiophenediyl, 2,5-furanylene, trans-1,4-cyclohexylene, trans-1,3-dioxane-2,5-diyl or 1,4-piperidyl;

ring $A^4$ is 1,4-phenylene, which is unsubstituted or substituted with halogen, cyano and/or nitro;

$Z^1$ is a single covalent bond, —$CH_2CH_2$—, —COO—, —$OCH_2$—, —$(CH_2)_4$—, —$O(CH_2)_3$— or —$(CH_2)_3O$—;

$R^1$ is hydrogen, halogen, cyano, nitro, alkyl with 1 to 12 carbon atoms, which is optionally substituted with fluorine and in which optionally 1 or 2 non-adjacent —$CH_2$— groups can be replaced by oxygen or —COO— and/or a —$CH_2CH_2$— group can be replaced by —CH═CH—;

n is 0 or 1;

X is hydrogen or alkyl with 1 to 6 carbon atoms, which is optionally substituted with halogen;

Y is hydrogen, cyano, —COO-alkyl, alkyl with 1 to 6 carbon atoms, which is optionally substituted with fluorine; and $S_a$, $S_b$ are spacer units;

with the proviso that in formula II-A simultaneously n does not signify 0, $A^1$ does not signify phenyl, $R^1$ does not signify hydrogen or methoxy, X and Y do not signify hydrogen and $S_a$ or $S_b$ does not signify a single bond.

4. A polymer according to claim 1, wherein the isomerization/dimerization units $Z_a$ and $Z_b$ each independently are of formula IIa

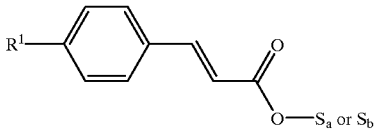

IIb

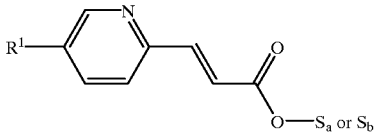

IIc

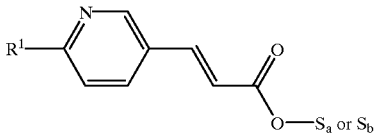

IId

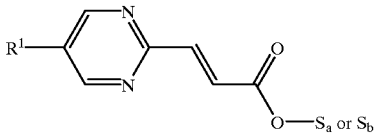

IIe

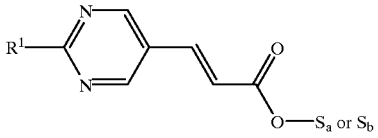

-continued

IIf

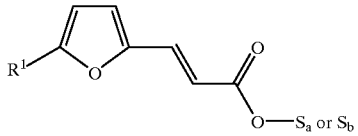

IIg

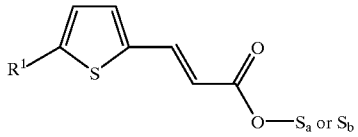

IIh

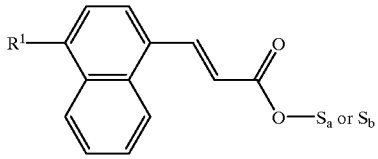

IIi

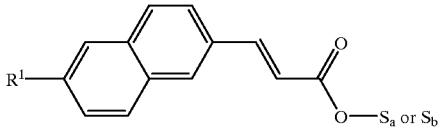

IIj

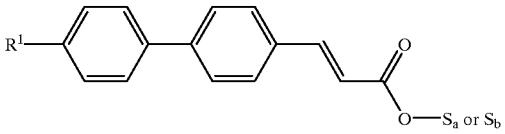

IIk

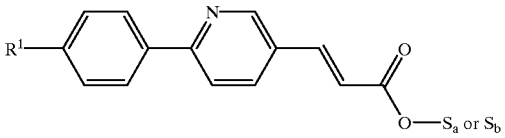

wherein $R^1$ is hydrogen, halogen, cyano, nitro, alkyl or alkoxy with 1 to 6 carbon atoms, with the proviso that in formula IIa simultaneously $R^1$ does not signify hydrogen or methoxy and $S_a$ or $S_b$ does not signify a single bond.

5. A polymer according to claim 1 selected from the group consisting of:

poly(methacryloyloxyethyl-3-(E)-[4-cyano-4'-biphenyl]acrylate;

poly(methacryloyloxyethyl-3(E)-[4-cyanophenyl]acrylate;

poly(methacryloyloxyethyl-3(E)-[4-chlorophenyl]acrylate);

poly(methacryloyloxyethyl-3(E)-[4-methoxyphenyl]acrylate);

poly(methacryloyloxyethyl-3(E)-[4-nitrophenyl]acrylate);

poly(3-methacryloylaminopropyl-(E)-3-[4-cyano-phenyl]acrylamide)

poly[1-[1-[(E)-3-(4-methoxy-phenyl)-acryloyl]piperidine-4-yloxycarbonyl]-1- methyl-ethylen]; and poly(methacryloyloxyethyl-3-(E)-biphenylacrylate).

6. A polymer according to claim 5, poly(methacryloyloxyethyl-3-(E)-[4-cyano-4'-biphenyl]acrylate.

7. A polymer according to formula 1-A

I-A

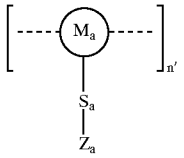

wherein $M_a$ is a monomer unit for a homopolymer;

$S_a$ is an alkylene chain with 1 to 10 carbon atoms, a cycloalkylene group with 3 to 8 carbon atoms in which optionally one or two methylene groups can be replaced by NH groups, or phenylene which can be substituted with lower alkyl, lower alkoxy, —CN, —$NO_2$, halogen, carbonate, an ester group, an amide group, an ether group or a combination of said groups;

$Z_a$ is of formula II

II

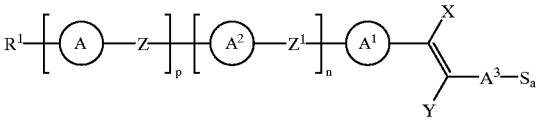

wherein, ring $A^1$ 1,4-phenylene, which is unsubstituted or substituted with at least one of halogen, cyano and nitro, or pyridine-2,5-yl, pyrimidine-2-5-yl, 2,5-thiophenediyl, 2,5-furanylene, 1,4- or 2,6-napthylene, in which a CH group can be replaced by nitrogen;

ring A,$A^2$ each individually are 1,4-phenylene, which is unsubstituted or substituted with at least one of halogen, cyano and nitro, pyridine-2-5-yl, pyrimidine-2,5-yl, or 2,5-thiophenediyl, 2,5-furanylene, trans-1,4-cyclohexylene, trans-1,3-dioxane-2,5-diyl or 1,4-piperidyl;

$A^3$ is —COO—, —CONH—, —CO—E—, 1,4-phenylene, which is unsubstituted or substituted with at least one of halogen, cyano and nitro, or pyridine-2,5-yl pyrimidine-2,5-yl, 2,5-thiophenediyl, 2,5-furanylene, 1,4- or 2,6-naphthylene, in which a CH group can be replaced by nitrogen;

E is 1,4-phenylene, which is unsubstituted or substituted with at least one of halogen, cyano and nitro, or pyridine-2,5-yl, pyrimidine-2,5-yl, 2,5-thiophenediyl, 2,5-furanylene, 1,4- or 2,6-naphthylene, in which a CH group can be replaced by nitrogen;

Z,$Z^1$ each independently are a single covalent bond, —$CH_2CH_2$—, —COO—, —OOC—, —$OCH_2$—, —$CH_2O$—, —C≡C—, —$(CH_2)_4$—, —$O(CH_2)_3$—, —$(CH_2)_3O$— or the trans form of —$OCH_2CH$═$CH$—, —$CH$═$CHCH_2O$—, —$(CH_2)_2CH$═$CH$— or —$CH$═$CH(CH_2)_2$—;

$R^1$ is hydrogen, halogen, cyano, nitro, NCS, alkyl with 1 to 12 carbon atoms, which is optionally substituted with fluorine and in which optionally 1 or 2 non-adjacent —$CH_2$— groups can be replaced by oxygen, —COO—, —OOC—, —CO— and/or a —$CH_2CH_2$— group can be replaced by —CH═CH—;

n,p each independently are 0 or 1;

X,Y each independently are hydrogen, halogen cyano, alkyl with 1 to 12 carbon atoms which is optionally substituted with fluorine and in which optionally 1 or 2 non-adjacent —$CH_2$— groups can be replaced by oxygen, —COO—, —OOC—, —CO— and/or —CH═CH—;

with the proviso that $A^3$ is different from —COO—, when simultaneously n and p each are 0, $A^1$ is phenyl, $R^1$ is hydrogen or methoxy and $S_a$ is a single bond;

n′ is from 4–100 000.

8. A polymer of the formula of formula I

I

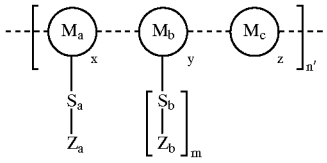

wherein $M_a$, $M_b$, $M_c$ are monomer units for homo- or copolymers;

x, y, z are mole fractions of the copolymers, whereby in each case $0<x\leqq 1$; $0\leqq y\leqq 1$ and $0\leqq z<1$;

$S_a$, $S_b$ are independently of one another, an alkylene chain with 1 to 10 carbon atoms, a cycloalkylene group with 3 to 8 carbon atoms in which optionally one or two methylene groups can be replaced by NH groups, or phenylene which can be substituted with lower alkyl, lower alkoxy, —CN, —$NO_2$ halogen, carbonate, an ester group, an amide group, an ether group or a combination of said groups;

$Z_a$, $Z_b$ each independently are of formula II-A,

II-A

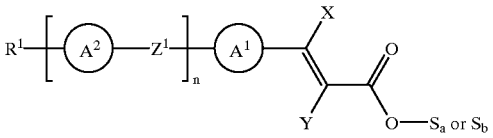

II-B, or

II-B

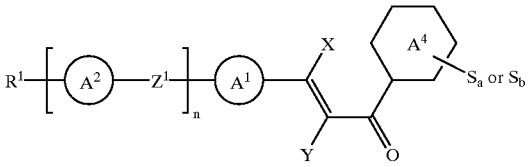

II-C

II-C

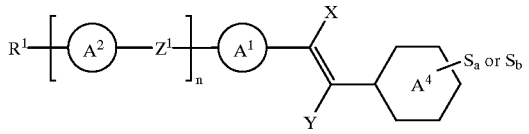

wherein ring $A^1$ is 1,4-phenylene, which is unsubstituted or substituted with halogen, cyano and/or nitro, or pyrimidine-2,5-diyl, pyridine-2,5-diyl, 2,5-thiophenediyl 2,5-furanylene, 1,4-naphthylene or 2,6-naphthylene;

*ring $A^2$ is 1,4-phenylene, which is unsubstituted or substituted with halogen, cyano and/or nitro, or pyrimidine-2,5-diyl, pyridine-2,5-diyl, 2,5-thiophenediyl, 2,5-furanylene, trans-1,4-cyclohexylene, trans-1,3-dioxane-2,5-diyl or 1,4-piperidyl;*

*ring $A^4$ is 1,4-phenylene, which is unsubstituted or substituted with halogen, cyano and/or nitro;*

*$Z^1$ is a single covalent bond, —$CH_2CH_2$—, —COO—, —$OCH_2$—, —$(CH_2)_4$—, —$O(CH_2)_3$— or —$(CH_2)_3O$—;*

*$R^1$ is hydrogen, halogen, cyano, nitro, alkyl with 1 to 12 carbon atoms, which is optionally substituted with fluorine and in which optionally 1 or 2 non-adjacent —$CH_2$— groups can be replaced by oxygen or —COO— and/or a —$CH_2CH_2$— group can be replaced by —CH═CH—;*

*n is 0 or 1;*

*X is hydrogen or alkyl with 1 to 6 carbon atoms which is optionally substituted with halogen;*

*Y is hydrogen, cyano, —COO-alkyl, alkyl with 1 to 6 carbon atoms, which is optionally substituted with fluorine; and*

*with the proviso that in formula II-A simultaneously n does not signify 0, $A^1$ does not signify phenyl, $R^1$ does not signify hydrogen or methoxy, X and Y do not signify hydrogen and $S_a$ or $S_b$ does not signify a single bond;*

*n′ is from 4–100 000; and*

*m is 0 or 1.*

* * * * *